US012804683B2

(12) United States Patent
Fujishiro et al.

(10) Patent No.: US 12,804,683 B2
(45) Date of Patent: Nov. 17, 2026

(54) COMMUNICATION METHOD, USER EQUIPMENT, AND BASE STATION

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 287 days.

(21) Appl. No.: 18/633,895

(22) Filed: Apr. 12, 2024

(65) Prior Publication Data

US 2024/0260063 A1 Aug. 1, 2024

Related U.S. Application Data

(63) Continuation of application No. PCT/JP2022/037903, filed on Oct. 11, 2022.

(60) Provisional application No. 63/255,573, filed on Oct. 14, 2021.

(51) Int. Cl.
*H04W 72/30* (2023.01)
*H04W 76/27* (2018.01)

(52) U.S. Cl.
CPC ........... *H04W 72/30* (2023.01); *H04W 76/27* (2018.02)

(58) Field of Classification Search
CPC .............................. H04W 72/30; H04W 76/27
See application file for complete search history.

(56) References Cited

U.S. PATENT DOCUMENTS

2010/0293372 A1 11/2010 Fischer et al.
2015/0305012 A1 10/2015 Yi et al.
2019/0261140 A1 8/2019 Fujishiro et al.
2022/0369089 A1* 11/2022 Venkatram ........ H04W 72/1263
2023/0124420 A1 4/2023 Kim et al.
2024/0031066 A1* 1/2024 Shirivastava ......... H04L 1/1657
2024/0155340 A1* 5/2024 Rajadurai ............. H04W 12/75

FOREIGN PATENT DOCUMENTS

CN 111818630 A 10/2020
JP 2017-518667 A 7/2017
JP 2019-091954 A 6/2019
(Continued)

OTHER PUBLICATIONS

Huawei, HiSilicon; "WID revision: NR Multicast and Broadcast Services"; 3GPP TSG RAN Meeting #88-e; RP-201038; E-meeting; Jun. 29-Jul. 3, 2020; pp. 1-6.
(Continued)

*Primary Examiner* — Ronald B Abelson

(74) *Attorney, Agent, or Firm* — Studebaker Brackett PLLC

(57) ABSTRACT

In a first aspect, a communication method is a method performed by a user equipment that receives, from a base station, a series of PDCP data PDU constituting multicast and broadcast service (MBS) data. The communication method includes receiving, from the base station, a hyper frame number that is counted up every time a sequence number included in a PDCP data PDU transmitted by the base station makes one round, and determining an initial value of a PDCP state variable managed by the user equipment from the hyper frame number and a PDCP sequence number included in the PDCP data PDU received by the user equipment from the base station.

6 Claims, 14 Drawing Sheets

(56) References Cited

FOREIGN PATENT DOCUMENTS

| | | | |
|---|---|---|---|
| WO | 2018/084195 | A1 | 5/2018 |
| WO | 2021/194219 | A1 | 9/2021 |

OTHER PUBLICATIONS

Xiaomi Communications; "Remaining PDCP Issues for MBS"; 3GPP TSG-RAN WG2 Meeting #115 electronic; R2-2108797; E-meeting; Aug. 9-27, 2021; pp. 1-5.

* cited by examiner

| | Delivery mode 1 | Delivery mode 2 |
|---|---|---|
| Intended for | Multicast sessions<br>(High QoS requirement) | Broadcast sessions<br>(Low QoS requirement) |
| Reception in | Connected | Connected<br>IDLE/INACTIVE |
| Configuration signalling by | RRC Reconfiguration | BCCH<br>MCCH |

COMMUNICATION METHOD, USER EQUIPMENT, AND BASE STATION

RELATED APPLICATIONS

The present application is a continuation based on PCT Application No. PCT/JP2022/037903, filed on Oct. 11, 2022, which claims the benefit of U.S. Provisional Patent Application No. 63/255,573 filed on Oct. 14, 2021. The content of which is incorporated by reference herein in their entirety.

TECHNICAL FIELD

The present disclosure relates to a communication method, a user equipment, and a base station used in a mobile communication system.

BACKGROUND OF INVENTION

In 3rd Generation Partnership Project (3GPP) standards, technical specifications of New Radio (NR) being radio access technology of the fifth generation (5G) have been defined. NR has features such as high speed, large capacity, high reliability, and low latency, in comparison to Long Term Evolution (LTE) being radio access technology of the fourth generation (4G). In 3GPP, there have been discussions for establishing technical specifications of multicast and broadcast services (MBS) of 5G/NR (for example, see Non-Patent Document 1).

CITATION LIST

Non-Patent Literature

Non-Patent Document 1: 3GPP Contribution: RP-201038, "WID revision: NR Multicast and Broadcast Services"

SUMMARY

5G/NR multicast and broadcast services are desired to provide enhanced services compared to 4G/LTE multicast and broadcast services.

In view of this, the present disclosure provides a communication method, a user equipment, and a base station for enabling implementation of enhanced multicast and broadcast services.

In a first aspect, a communication method is a communication method performed by a user equipment that receives, from a base station, a series of Packet Data Convergence Protocol (PDCP) data Protocol Data Unit (PDU) constituting multicast and broadcast service (MBS) data and includes receiving a radio resource control (RRC) Reconfiguration message including a hyper frame number from the base station, the hyper frame number being counted up every time a sequence number included in a PDCP data PDU transmitted by the base station makes one round; and determining an initial value of a PDCP state variable managed by the user equipment, based on the hyper frame number included in the RRC Reconfiguration message.

In a second aspect, a user equipment is a user equipment that receives, from a base station, a series of Packet Data Convergence Protocol (PDCP) data Protocol Data Unit (PDU) constituting multicast and broadcast service (IBS) data and includes a receiver that receives a radio resource control (RRC) Reconfiguration message including a hyper frame number from the base station, the hyper frame number being counted up every time a sequence number included in a PDCP data PDU transmitted by the base station makes one round; and a controller that determines an initial value of a PDCP state variable managed by the user equipment, based on the hyper frame number included in the RRC Reconfiguration message.

In a third aspect, a base station is a base station that transmits, to a user equipment, a series of Packet Data Convergence Protocol (PDCP) data Protocol Data Unit (PDU) constituting multicast and broadcast service (IBS) data and includes a transmitter that transmits a radio resource control (RRC) Reconfiguration message including a hyper frame number to the user equipment, the hyper frame number being counted up every time a sequence number included in a PDCP data PDU transmitted by the base station makes one round.

DESCRIPTION OF EMBODIMENTS

A mobile communication system according to an embodiment is described with reference to the drawings. In the description of the drawings, the same or similar parts are denoted by the same or similar reference signs.

Configuration of Mobile Communication System

Figure 1:
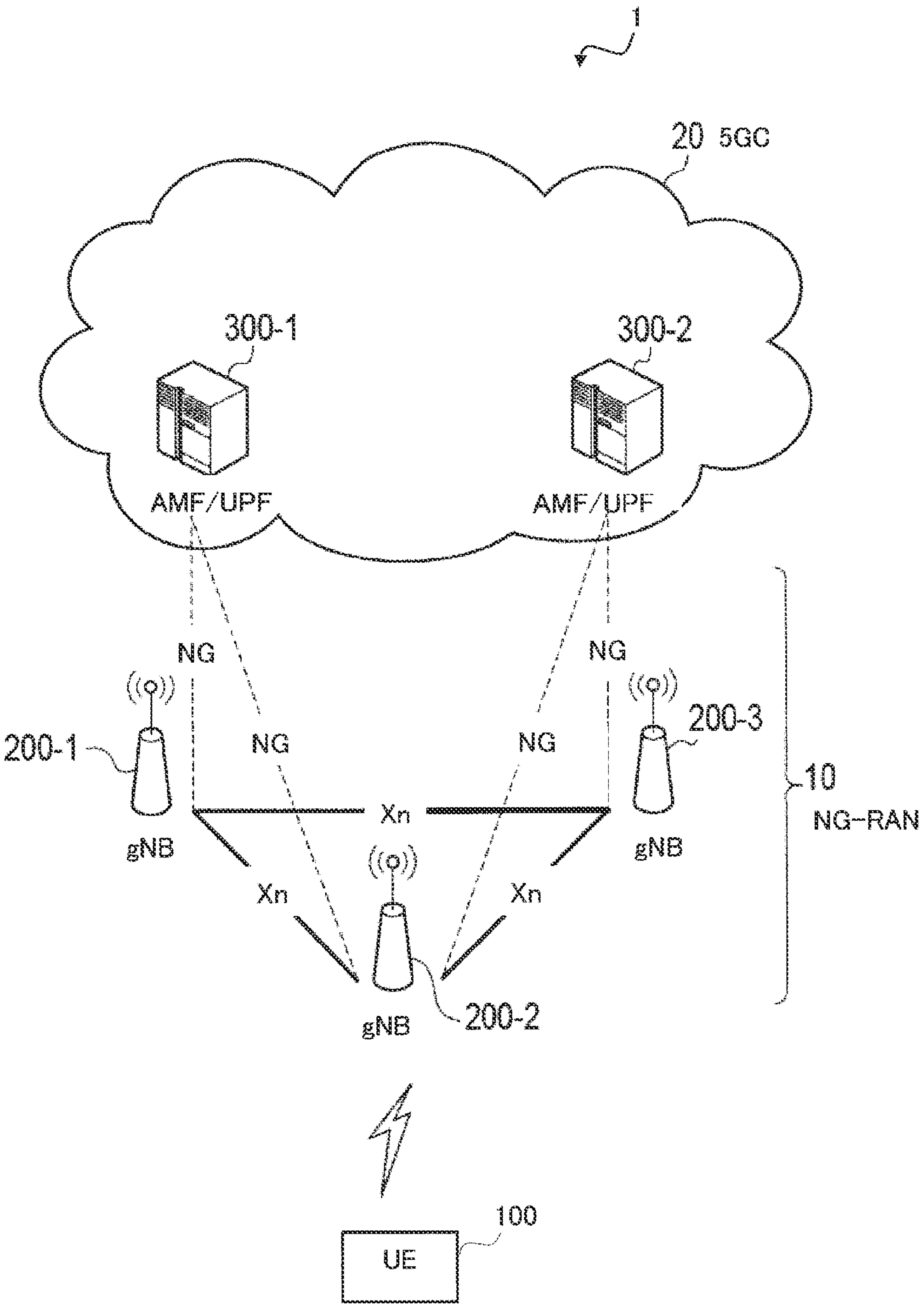
FIG. 1 is a diagram illustrating a configuration of a mobile communication system according to an embodiment.

FIG. 1 is a diagram illustrating a configuration of a mobile communication system according to an embodiment. The mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20. The NG-RAN 10 may be hereinafter simply referred to as a RAN 10. The 5GC 20 may be simply referred to as a core network (CN) 20.

The UE 100 is a mobile wireless communication apparatus. The UE 100 may be any apparatus as long as the UE 100 is used by a user. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency (hereinafter simply referred to as one "frequency").

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface which is an interface between a base station and the core network.

Figure 2:
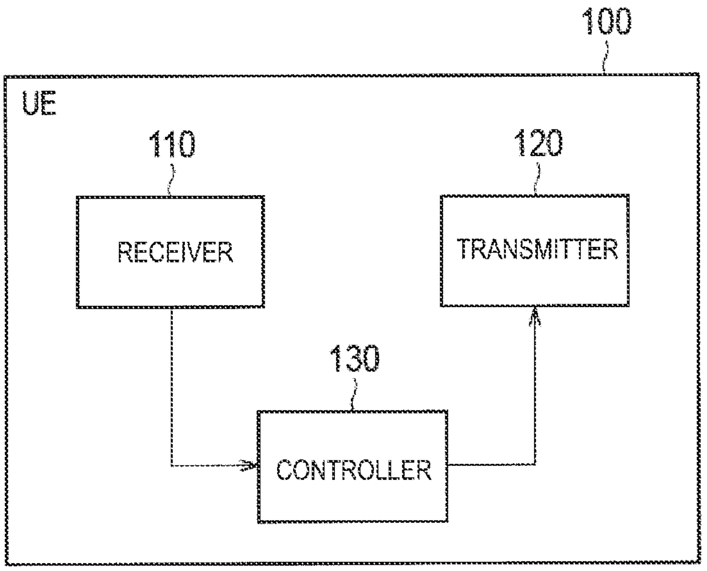
FIG. 2 is a diagram illustrating a configuration of a user equipment (UE) according to an embodiment.

FIG. 2 is a diagram illustrating a configuration of the UE 100 (user equipment) to the embodiment. The UE 100 includes a receiver 110, a transmitter 120, and a controller 130. The receiver 110 and the transmitter 120 constitute a wireless communicator that performs wireless communication with the gNB 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processes include processes of respective layers to be described later. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
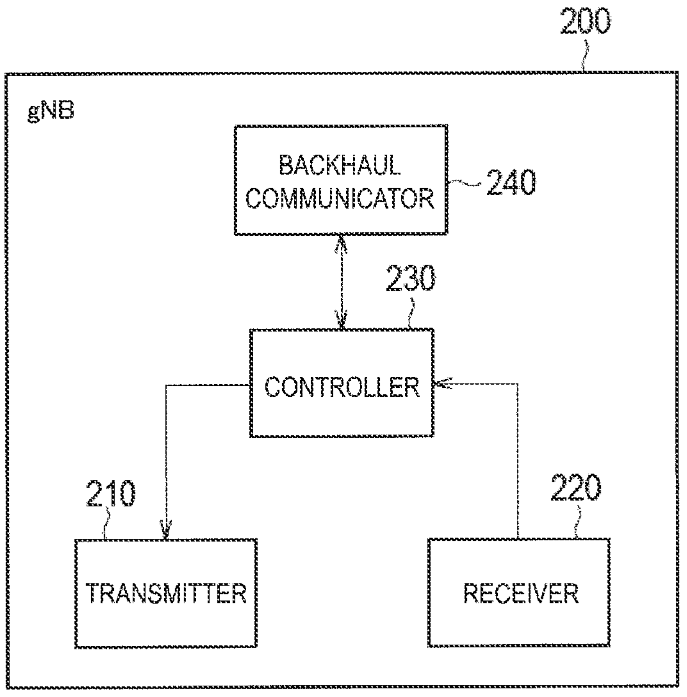
FIG. 3 is a diagram illustrating a configuration of a gNB (base station) according to an embodiment.

FIG. 3 is a diagram illustrating a configuration of the gNB 200 (base station) according to the embodiment. The gNB 200 includes a transmitter 210, a receiver 220, a controller 230, and a backhaul communicator 240. The transmitter 210 and the receiver 220 constitute a wireless communicator that performs wireless communication with the UE 100. The backhaul communicator 240 constitutes a network communicator that performs communication with the CN 20.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processes in the gNB 200. Such processes include processes of respective layers to be described later. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via an Xn interface between base stations. The backhaul communicator 240 is connected to the AMF/UPF 300 via a NG interface between a base station and the core network. Note that the gNB 200 may include a Central Unit (CU) and a Distributed Unit (DU) (i.e., functions are divided), and the two units may be connected via an F1 interface, which is a fronthaul interface.

Figure 4:
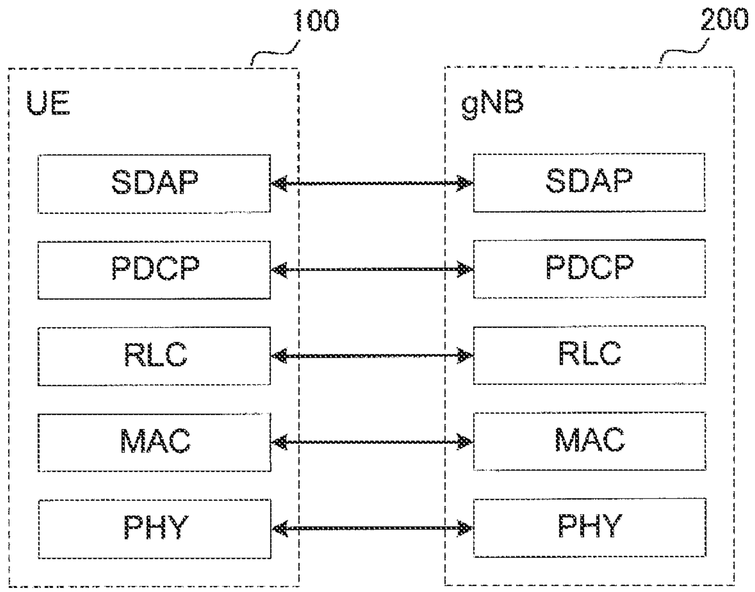
FIG. 4 is a diagram illustrating a configuration of a protocol stack of a radio interface of a user plane handling data.

FIG. 4 is a diagram illustrating a configuration of a protocol stack of a radio interface of a user plane handling data.

A radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel. Note that the PHY layer of the UE 100 receives downlink control information (DCI) transmitted from the gNB 200 over a physical downlink control channel (PDCCH). Specifically, the UE 100 blind decodes the PDCCH using a radio network temporary identifier (RNTI) and acquires successfully decoded DCI as DCI addressed to the UE 100. The DCI transmitted from the gNB 200 is appended with CRC parity bits scrambled by the RNTI.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 5:
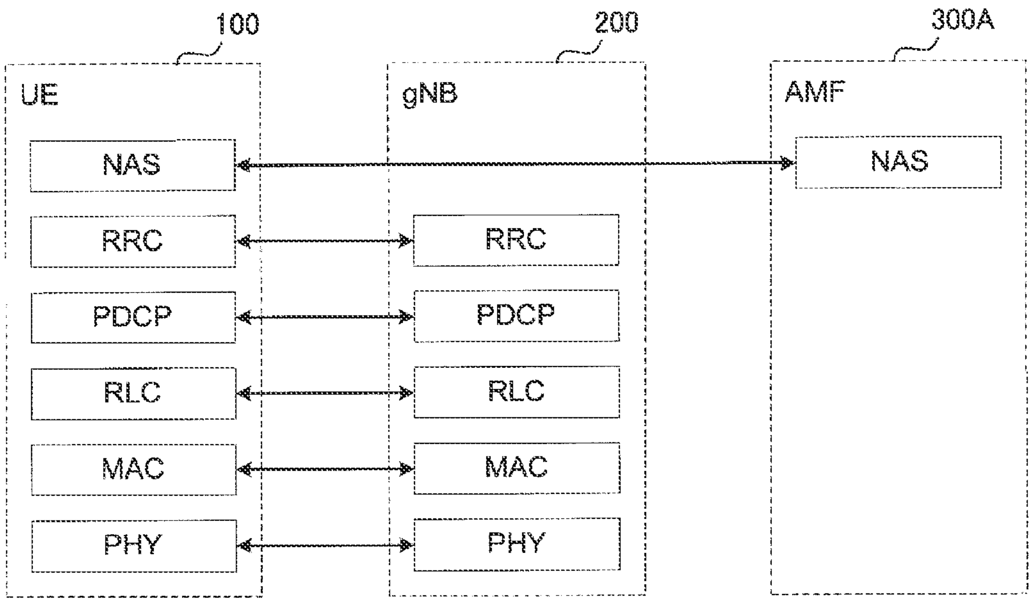
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (a control signal).

The protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection (RRC connection) between the RRC of the UE 100 and the RRC of the gNB 200 is present, the UE 100 is in an RRC connected state. When no connection (RRC connection) between the RRC of the UE 100 and the RRC of the gNB 200 is present, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signalling is transmitted between the NAS layer of the UE 100 and the NAS layer of an AMF 300A. Note that the UE 100 includes an application layer other than the protocol of the radio interface. A layer lower than the NAS layer is referred to as an AS layer.

Overview of MBS

An overview of the MBS according to the MBS according to an embodiment will be provided embodiment will be provided. The MBS is a service in which the NG-RAN 10 can provide broadcast or multicast, i.e., Point To Multipoint (PTM) data transmission to the UE 100. Assumed use cases (service types) of the MBS include public safety communication, mission critical communication, Vehicle to Everything (V2X) communication, IPv4 or IPv6 multicast delivery, Internet protocol television (IPTV), group communication, and software delivery.

A broadcast service provides a service to every UE 100 within a particular service area for an application not requiring highly reliable QoS. An MBS session used for the broadcast service is referred to as a broadcast session.

A multicast service provides a service not to every UE 100, but to a group of UEs 100 joining the multicast service (multicast session). An MBS session used for the multicast service is referred to as a multicast session. The multicast service can provide the same content to the group of UEs 100 through a method with higher radio efficiency than the broadcast service.

Figures 6, 7:
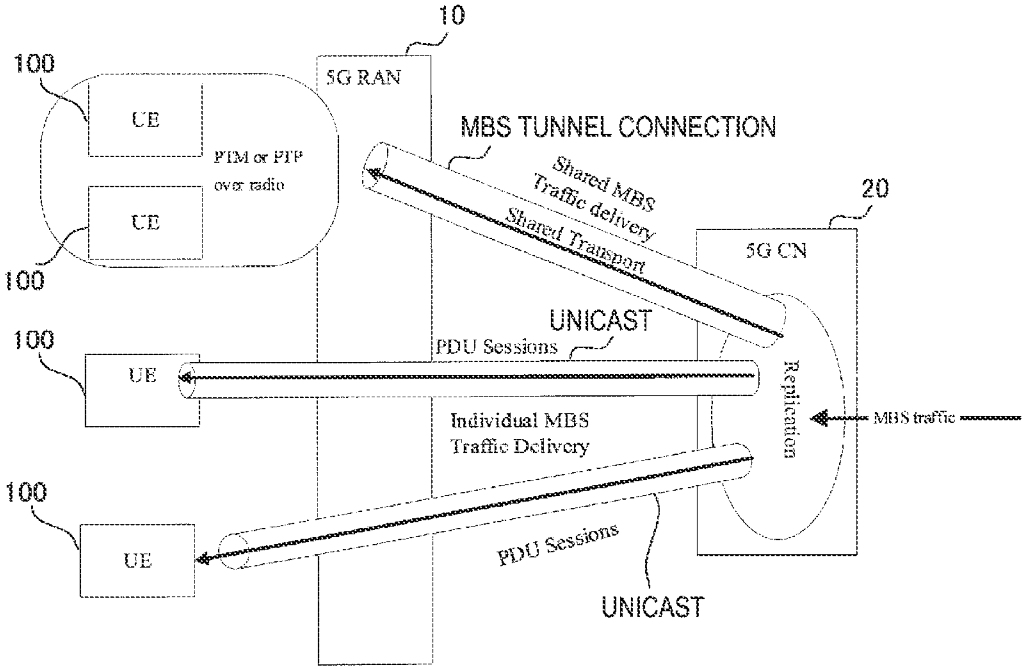
FIG. 6 is a diagram illustrating an overview of MBS traffic delivery according to an embodiment.
FIG. 7 is a diagram illustrating delivery modes according to an embodiment.

FIG. 6 is a diagram illustrating an overview of MBS traffic delivery according to the embodiment.

MBS traffic (MBS data) is delivered from a single data source (application service provider) to a plurality of UEs. The 5G CN (5GC) 20, which is a 5G core network, receives the MBS data from the application service provider and performs Replication of the MBS data to deliver the resultant.

From the perspective of the 5GC 20, two multicast delivery methods are possible: 5GC Shared MBS Traffic delivery and 5GC Individual MBS Traffic delivery.

In the 5GC individual MBS traffic delivery method, the 5GC 20 receives a single copy of MBS data packets and delivers individual copies of these MBS data packets to the individual UEs 100 via PDU sessions of the individual UEs 100. Thus, one PDU session for each UE 100 needs to be associated with a multicast session.

In the 5GC shared MBS traffic delivery method, the 5GC 20 receives a single copy of MBS data packets and delivers the single copy of the MBS packets to a RAN node (i.e., the gNB 200). The gNB 200 receives the MBS data packets via MBS tunnel connection, and delivers those to one or more UEs 100.

From the perspective of the RAN (5G RAN) 10, two delivery methods are possible for radio transmission of the MBS data in the 5GC shared MBS traffic delivery method: a Point-to-Point (PTP) delivery method and a Point-to-Multipoint (PTM) delivery method. PTP means unicast, and PTM means multicast and broadcast.

In the PTP delivery method, the gNB 200 wirelessly delivers the individual copies of the MBS data packets to the individual UEs 100. On the other hand, in the PTM delivery method, the gNB 200 wirelessly delivers the single copy of the MBS data packets to a group of the UEs 100. The gNB 200 can dynamically determine whether to use the PTM or PTP delivery method as a method for delivering the MBS data to one UE 100.

The PTP and PTM delivery methods are mainly related to the user plane. Modes for controlling the MBS data delivery include two delivery modes: a first delivery mode and a second delivery mode.

FIG. 7 is a diagram illustrating delivery modes according to the embodiment.

The first delivery mode (Delivery mode 1 (DM1)) is a delivery mode that can be used by the UE 100 in the RRC connected state, and is a delivery mode for high QoS requirements. The first delivery mode is used for multicast sessions among MBS sessions. Note that the first delivery mode may be used for broadcast sessions. The first delivery mode may be available to the UE 100 in the RRC idle state or the RRC inactive state.

MBS reception configuration in the first delivery mode is performed through UE-dedicated signalling. For example, the MBS reception configuration in the first delivery mode is performed through an RRC Reconfiguration message (or an RRC Release message), which is an RRC message unicast from the gNB 200 to the UE 100.

The MBS reception configuration includes MBS traffic channel configuration information (hereinafter referred to as "MTCH configuration information") about configuration of an MBS traffic channel transmitting MBS data. The MTCH configuration information includes MBS session information (including an MBS session identifier described below) relating to an MBS session and scheduling information of the MBS traffic channel corresponding to the MBS session. The scheduling information of an MBS traffic channel may include discontinuous reception (DRX) configuration of the MBS traffic channel. The discontinuous reception configuration may include at least one parameter of a timer value (On Duration Timer) for defining an on-period (On Duration: reception period), a timer value (Inactivity Timer) for extending the on-period, a scheduling interval or a DRX cycle (Scheduling Period, DRX Cycle), an offset value (Start Offset, DRX Cycle Offset) of a start subframe for scheduling or a DRX cycle, a start delay slot value (Slot Offset) of an on-period timer, a timer value (Retransmission Timer) for defining a maximum time until retransmission, and a timer value (HARQ RTT Timer) for defining a minimum interval until DL assignment of HARQ retransmission.

Note that the MBS traffic channel is a type of logical channel and may be referred to as an MTCH. The MBS traffic channel is mapped to a downlink shared channel (Down Link-Shared CHannel (DL-SCH)) being a type of transport channel.

The second delivery mode (Delivery mode 2 (DM2)) is a delivery mode that can be used not only by the UE 100 in the RRC connected state, but also by the UE 100 in the RRC idle state or the RRC inactive state, and is a delivery mode for low QoS requirements. The second delivery mode is used for broadcast sessions among MBS sessions. However, the second delivery mode may also be applicable to multicast sessions.

An MBS reception configuration in the second delivery mode is performed through broadcast signalling. For example, the MBS reception configuration in the second delivery mode is performed using a logical channel transmitted from the gNB 200 to the UE 100 through broadcast, for example, a broadcast control channel (BCCH) and/or a multicast control channel (MCCH). The UE 100 can receive the BCCH and the MCCH, using a dedicated RNTI defined in technical specifications in advance, for example. The RNTI for BCCH reception may be an SI-RNTI, and the RNTI for MCCH reception may be an MCCH-RNTI.

In the second delivery mode, the UE 100 may receive the MBS data in the following three procedures. First, the UE 100 receives MCCH configuration information on a SIB (MBS SIB) transmitted from the gNB 200 on the BCCH. Second, the UE 100 receives the MCCH from the gNB 200, based on the MCCH configuration information. On the MCCH, MTCH configuration information is transmitted. Third, the UE 100 receives the MTCH (MBS data), based on the MTCH configuration information. The MTCH configuration information and/or the MCCH configuration information may be hereinafter referred to as the MBS reception configuration.

In the first delivery mode and the second delivery mode, the UE 100 may receive the MTCH, using a group RNTI (G-RNTI) assigned from the gNB 200. The G-RNTI corresponds to an RNTI for MTCH reception. The G-RNTI may be included in the MBS reception configuration (MTCH configuration information).

The network can provide different MBS services for different MBS sessions. The MBS session is identified by at least one selected from the group consisting of a Temporary Mobile Group Identity (TMGI), a source-specific IP multicast address (which consists of a source unicast IP address, such as an application function and an application server, and an IP multicast address indicating a destination address), a session identifier, and a G-RNTI. At least one selected from the group consisting of the TMGI, the source specific IP multicast address, and the session identifier is referred to as an MBS session identifier. The TMGI, the source-specific IP multicast address, the session identifier, and the G-RNTI are collectively referred to as MBS session information.

Figure 8:
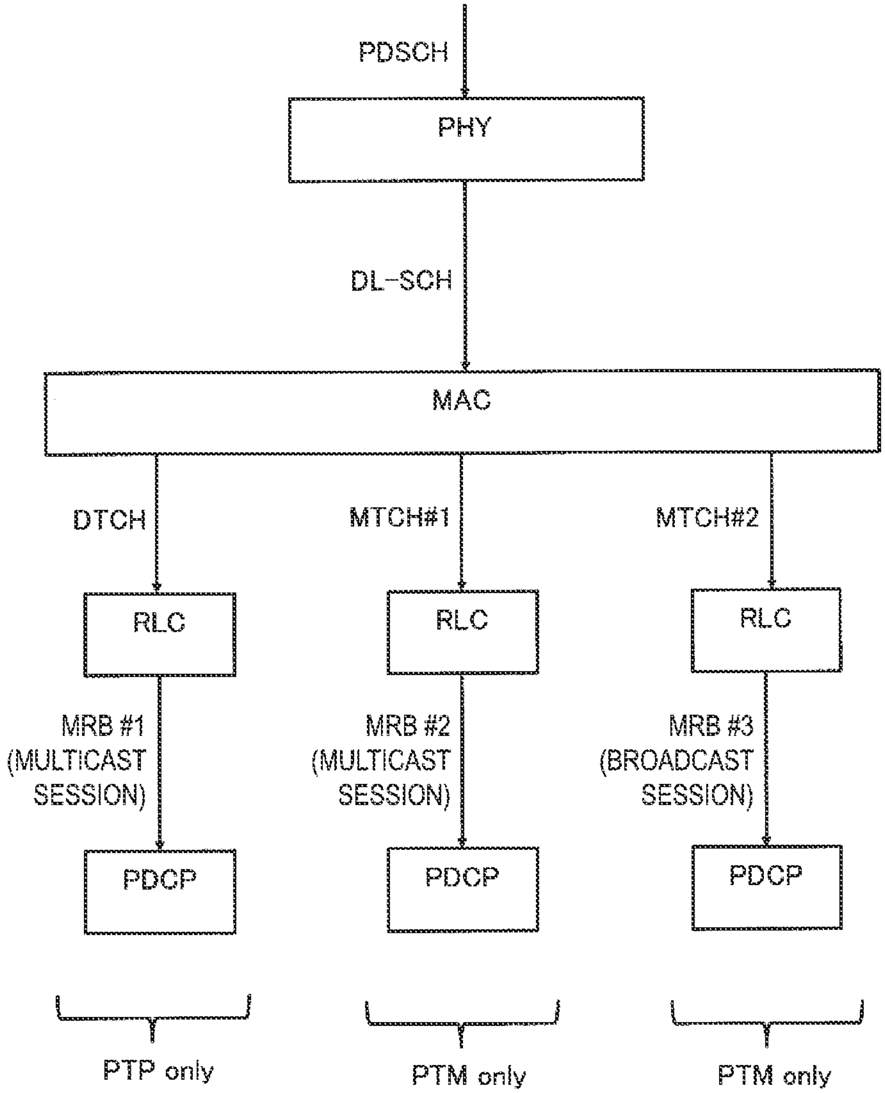
FIG. 8 is a diagram illustrating an example of internal processing related to IBS reception of a UE 100 according to an embodiment.
Figure 9:
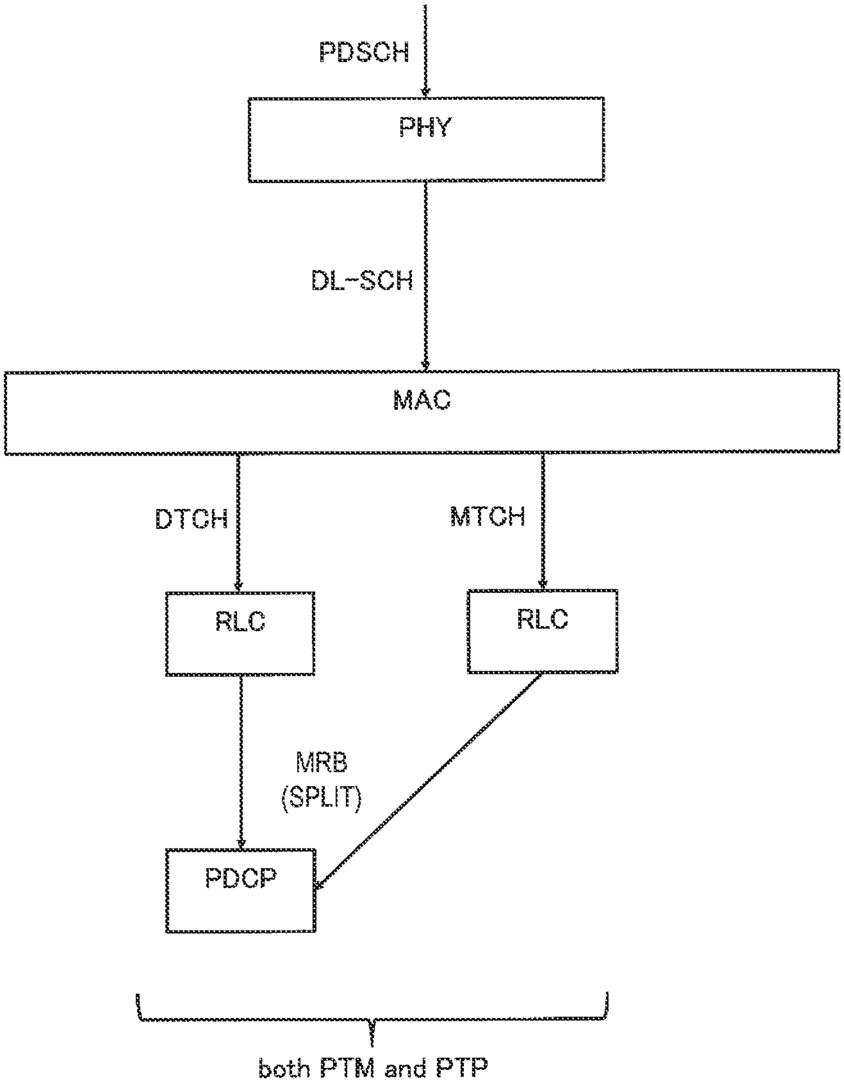
FIG. 9 is a diagram illustrating another example of the internal processing related to the MBS reception of the UE 100 according to an embodiment.

FIG. 8 is a diagram illustrating an example of internal processing related to the MBS reception of the UE 100 according to an embodiment. FIG. 9 is a diagram illustrating another example of the internal processing related to the MBS reception of the UE 100 according to an embodiment.

One MBS radio bearer (MRB) is one radio bearer transmitting a multicast session or a broadcast session. That is, a multicast session may be associated with an MRB or a broadcast session may be associated with an MRB.

The MRB and the corresponding logical channel (e.g., MTCH) are configured for the UE 100 from the gNB 200 through RRC signalling. An MRB configuration procedure may be separated from a data radio bearer (DRB) configuration procedure. In the RRC signalling, one MRB can be configured with "PTM only", "PTP only", or "both PTM and PTP". The type of MRB may be changed by the RRC signalling.

FIG. 8 illustrates an example in which a multicast session and a dedicated traffic channel (DTCH) are associated with an MRB #1, a multicast session and an MTCH #1 are associated with an MRB #2, and a broadcast session and an MTCH #2 are associated with an MRB #3. That is, the MRB #1 is configured with PTP only MRB, the MRB #2 is configured with PTM only MRB, and the MRB #3 is configured with PTM only MRB. Note that the DTCH is scheduled using a cell RNTI (C-RNTI). The MTCH is scheduled using the G-RNTI.

The PHY layer of the UE 100 processes user data (received data) received on the PDSCH, which is one of physical channels, and routes the processed user data to the downlink shared channel (DL-SCH), which is one of transport channels. The MAC layer (MAC entity) of the UE 100 processes the data received on the DL-SCH and routes the received data to a corresponding logical channel (corresponding RLC entity) based on a logical channel identifier (LCID) included in the header (MAC header) included in the received data.

FIG. 9 illustrates an example in which the DTCH and the MTCH are associated with the MRB associated with the multicast session. Specifically, one MRB is split into two legs, one leg is associated with the DTCH, and the other leg is associated with the MTCH. The two legs are combined at the PDCP layer (PDCP entity). That is, the MRB is an MRB configured with both PTM and PTP. Such an MRB may be referred to as a split MRB.

Operation of PDCP Layer

Figure 10:
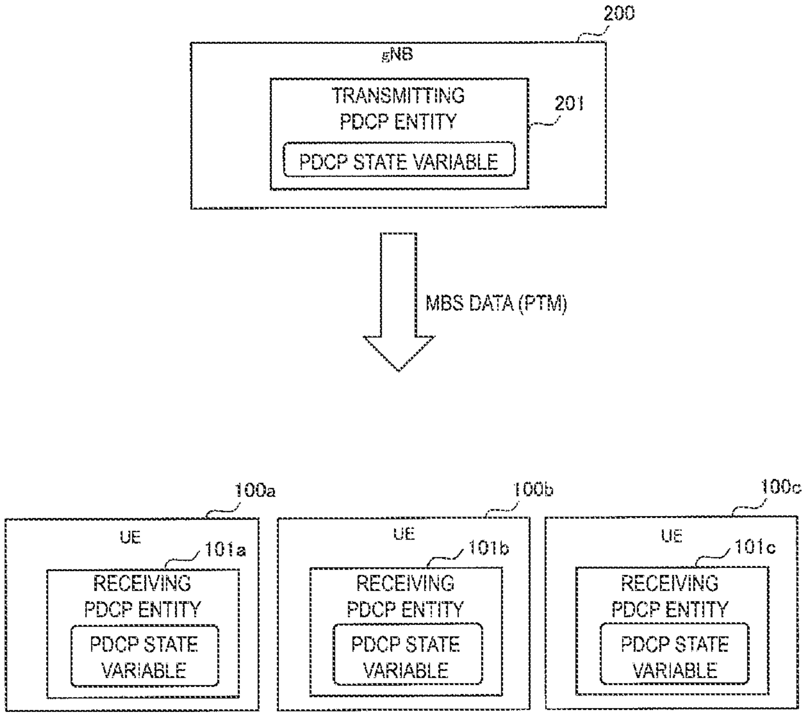
FIG. 10 is a diagram illustrating operations of a PDCP layer in the mobile communication system according to an embodiment.

FIG. 10 is a diagram illustrating operations of the PDCP layer in the mobile communication system 1 according to an embodiment.

The gNB 200 transmits MBS data of a certain MBS session to a plurality of UEs 100 (in the example of FIG. 10, a UE 100*a* to a UE 100*c*) via PTM (multicast or broadcast). The RRC state of each UE 100 may be any state (the RRC connected state, the RRC idle state, or the RRC inactive state). The MBS delivery mode may be the first delivery mode or the second delivery mode.

In the PDCP layer, the gNB 200 includes a transmitting PDCP entity 201 associated with the MBS session (specifically, a transmitting PDCP entity associated with a multicast radio bearer (MRB) belonging to the MBS session). The transmitting PDCP entity 201, when starting transmission of an MBS session, manages PDCP state variables updated in response to transmission of a PDCP data Protocol Data Unit (PDU) in the MBS session.

In the PDCP layer, each UE 100 includes a receiving PDCP entity 101 associated with the MBS session (specifically, a receiving PDCP entity associated with an MRB belonging to the MBS session). Each receiving PDCP entity 101 (in the example of FIG. 10, each of a receiving PDCP entity 101*a* to a receiving PDCP entity 101*c*), when starting reception of an MBS session, manages PDCP state variables updated in response to reception of a PDCP data PDU in the MBS session.

Figure 11:
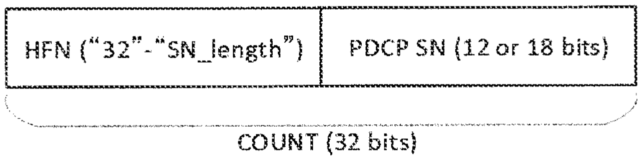
FIG. 11 is a diagram illustrating an example of PDCP state variables according to an embodiment.

As illustrated in FIG. 11, the PDCP state variables may include a count value (COUNT value) consisting of a hyper frame number (HFN) that is counted up every time a PDCP sequence number makes one round and a PDCP sequence number (PDCP SN). For example, the COUNT value has a bit length of 32 bits, the PDCP SN has a bit length (SN length) of 12 bits or 18 bits, and the HFN has a bit length obtained by subtracting the bit length of the PDCP SN from the bit length of the COUNT value. The bit length of the PDCP SN may be configured using RRC signalling. The bit length of the PDCP SN may be a default value (a fixed value that is determined in advance). Note that the term "PDCP state variable" need not necessarily indicate the COUNT value, and may also be used as a term indicating various variables (such as the HFN, the PDCP SN, or the TX_NEXT, the RX_NEXT, the RX_DELIV, and the RX_REORD) handled in the PDCP layer.

Figure 12:
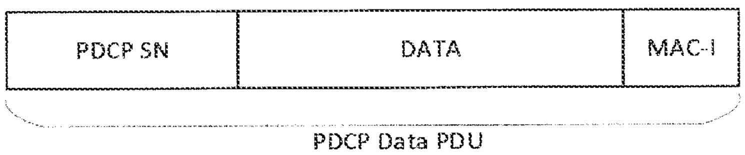
FIG. 12 is a diagram illustrating an example of a PDCP data PDU constituting MBS data according to an embodiment.

FIG. 12 is a diagram illustrating an example of the PDCP data PDU constituting MBS data. As illustrated in FIG. 12, the PDCP data PDU includes a PDCP SN, data, and a MAC-I. The PDCP SN is a sequence number sequentially assigned to the PDCP data PDU. The data corresponds to a PDCP Service Data Unit (SDU). The MAC-I corresponds to a message authentication code. The PDCP data PDU may not include the MAC-I. As described above, the PDCP data PDU includes the PDCP SN but does not include the HFN. Thus, each of the gNB 200 and the UE 100 needs to update the HFN in response to transmission and reception of the PDCP data PDU, specifically, count up the HFN every time the PDCP sequence number makes one round.

Figure 13:
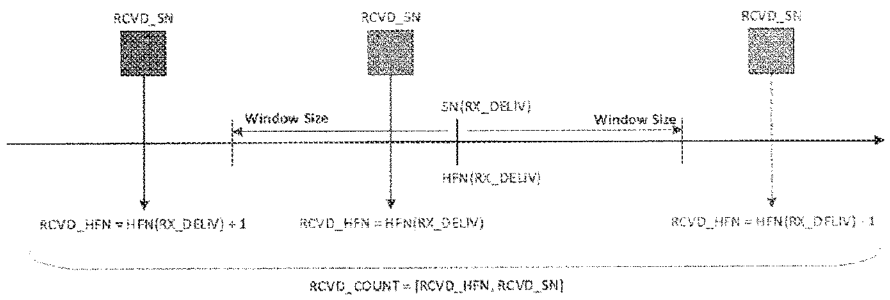
FIG. 13 is a diagram illustrating operations for identifying RCVD_COUNT that is a COUNT value of the PDCP data PDU received in a receiving PDCP entity of the UE according to an embodiment.

FIG. 13 is a diagram illustrating operations for identifying RCVD_COUNT that is a COUNT value of the PDCP data PDU received in the UE 100 (the receiving PDCP entity 101). Here, the PDCP SN included in the received PDCP data PDU is referred to as RCVD_SN.

First, when RCVD_SN<SN (RX_DELIV)−Window_Size, RCVD_HFN=HFN(RX_DELIV)+1. Here, RX_DELIV is a variable indicating the oldest of the PDCP SDUs which are to be received and have not yet been provided to a higher layer. The initial value of RX_DELIV is zero. In a PTM reception, the initial value of RX_DELIV may be set using the SN of the first received packet. Window_Size is a constant indicating the size of a reordering window.

Second, when RCVD_SN≥SN (RX_DELIV)+Window_Size, RCVD_HFN=HFN(RX_DELIV)−1.

Third, when neither of the above conditions is satisfied, RCVD_HFN=HFN(RX_DELIV).

Then, RCVD_COUNT=[RCVD_HFN, RCVD_SN] is set.

Figure 14:
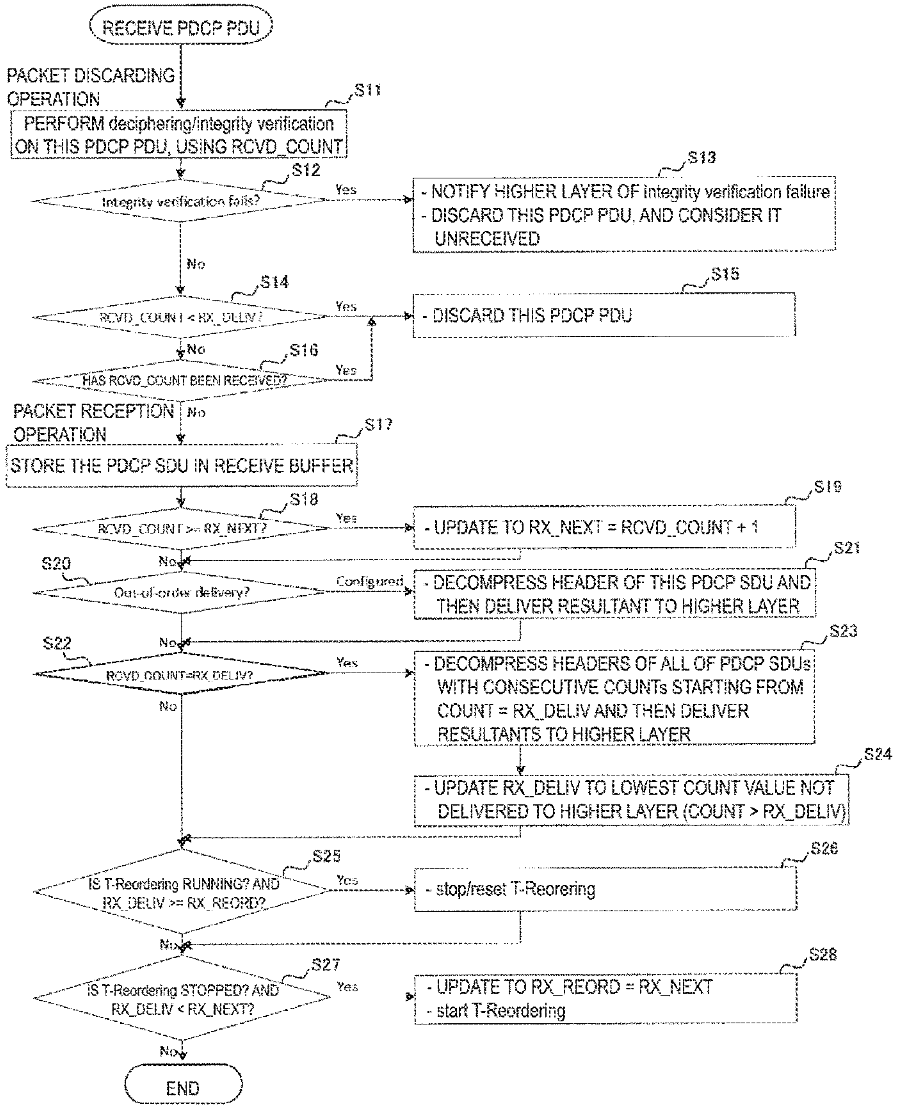
FIG. 14 is a diagram illustrating operations of the receiving PDCP entity of the UE according to an embodiment.

FIG. 14 is a diagram illustrating operations of the receiving PDCP entity 101 of the UE 100.

First, the receiving PDCP entity 101, when receiving the PDCP PDU (PDCP data PDU), performs security processing (specifically, deciphering/integrity verification) using the count value (RCVD_COUNT) on the PDCP PDU (step S12), and the receiving PDCP entity 101, when failing in the integrity verification (step S12: Yes), notifies a higher layer of the integrity verification failure and discards the PDCP PDU (step S13).

When the receiving PDCP entity 101 succeeds in the integrity verification (Step S12: No), and the count value (RCVD_COUNT) is smaller than RX_DELIV (Step S14: Yes) or RCVD_COUNT has been received (Step S16: Yes), the receiving PDCP entity 101 discards the PDCP PDU (Step S15).

Next, the receiving PDCP entity 101 stores the undiscarded PDCP PDU in a receive buffer (Step S17), and when "RCVD_COUNT≥RX_NEXT" (Step S18: Yes), the receiving PDCP entity 101 updates to RX_NEXT=RCVD_COUNT+1 (Step S19). Here, RX_NEXT is a variable indicating a count value (RCVD_COUNT) of the PDCP SDU expected to be received next. The initial value of RX_NEXT is zero. In the PTM reception, the initial value of RX_NEXT may be set using the SN of the first received packet. When Out-of-order delivery is Configured (step S20: Yes), the receiving PDCP entity 101 decompresses a header of the PDCP PDU and then delivers the resultant to a higher layer (step S21). Specifically, when "outOfOrderDelivery" is configured in RRC, the receiving PDCP entity 101 performs an operation of step S21. Out of order delivery is an operation of delivering packets to a higher layer without performing order control. Thus, as in step S21, immediately after a packet is received and is stored in a buffer, the packet is delivered to a higher layer. Note that, when step S20 is "No", order control is performed.

When "RCVD_COUNT=RX_DELIV" (Step S22: Yes), the receiving PDCP entity 101 decompresses headers of all of the PDCP SDUs with consecutive COUNTs starting from COUNT=RX_DELIV and then delivers the resultants to a higher layer (Step S23), and updates RX_DELIV to a first (lowest) COUNT value that has not been delivered to a higher layer (Step S24).

When T-Reordering is running and "RX_DELIV≥RX_REORD" (Step S25: Yes), the receiving PDCP entity 101 stops and resets T-Reordering (Step S26). Here, T-Reordering is a timer used for detecting loss of the PDCP data PDU. RX_REORD is a variable indicating a COUNT value that follows the COUNT value associated with the PDCP data PDU for triggering T-Reordering.

When T-Reordering is stopped and "RX_DELIV<RX_REORD" (step S27: Yes), the receiving PDCP entity 101 updates to RX_REORD=RX_NEXT and starts T-Reordering (step S28).

Operation of Mobile Communication System

In general, the initial value of each PDCP state variable is 0, and when data transmission from the gNB 200 (the transmitting PDCP entity 201) to the UE 100 (the receiving PDCP entity 101) is started, the PDCP state variable is updated synchronously between the gNB 200 (the transmitting PDCP entity 201) and the UE 100 (the receiving PDCP entity 101).

However, in a scenario as illustrated in FIG. 10, the UE 100 (any one of the UE 100*a* to the UE 100*c*) cannot necessarily start MBS reception at the time when the gNB 200 starts providing an MBS session (a multicast session or a broadcast session), and thus the PDCP state variable is un-synchronized between the gNB 200 (the transmitting PDCP entity 201) and the UE 100 (the receiving PDCP entity 101) to cause an issue that the PDCP later operation as described above cannot be appropriately performed. For example, any one of the UEs 100 may start MBS reception midway of the MBS session provided by the gNB 200. Such a UE 100 may also be a UE 100 that has made cell change (e.g. cell reselection or handover) from another gNB 200 (another cell).

Figure 15:
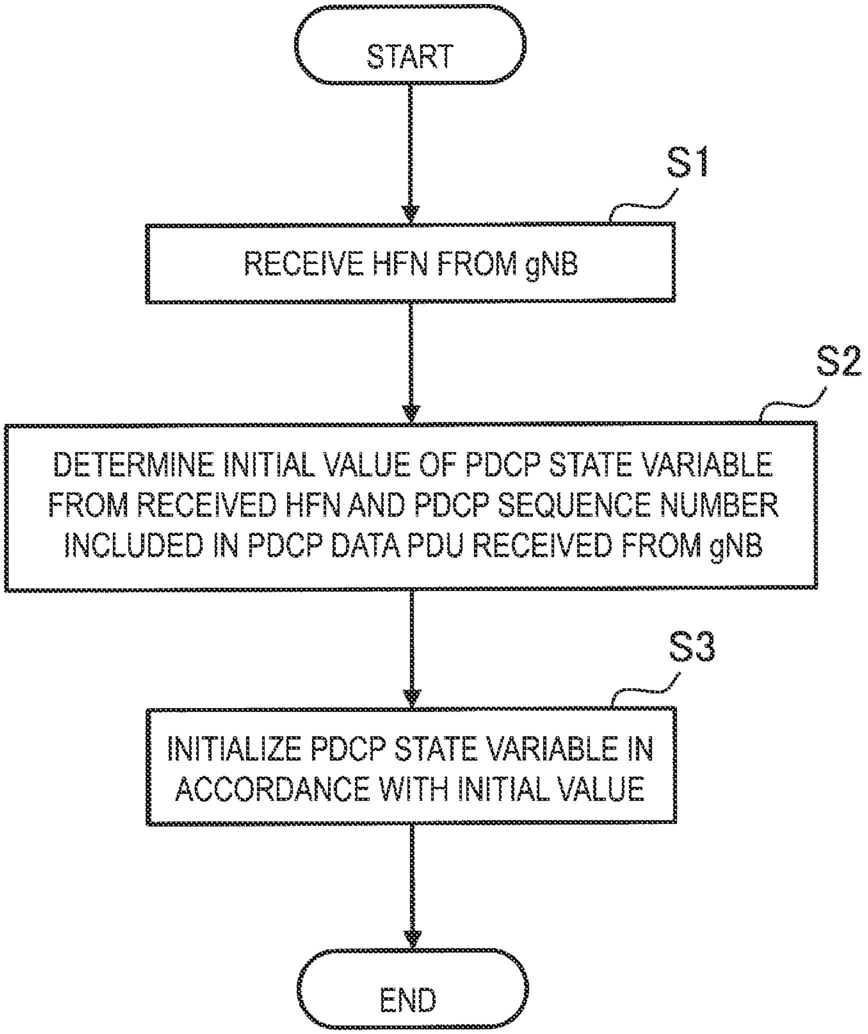
FIG. 15 is a diagram illustrating operations of the UE according to an embodiment.

FIG. 15 is a diagram illustrating operations of the UE 100 according to the embodiment. In the embodiment, the receiving PDCP entity 101 of the UE 100 receives from the gNB 200 a series of PDCP data PDU constituting the MBS data transmitted via PTM from the gNB 200. The PDCP data PDU may be referred to as PDCP MRB data PDU.

In step S1, the UE 100 that receives a specific MRB, receives from the gNB 200, the HFN (to be more specific, the current (latest) HFN in the specific MRB) that is counted up every time the sequence number (PDCP SN) included in the PDCP data PDU transmitted by the gNB 200 makes one round.

Prior to step S1, the UE 100 may request the gNB 200 to provide the HFN. The UE 100 may request the gNB 200 to provide the HFN in response to a condition concerning failing to successfully receive the MBS data (PDCP data PDU) being satisfied. For example, the UE 100 may request the gNB 200 to provide the HFN in response to a first condition and/or a second condition being satisfied. The first condition indicates that a duration of consecutive failures in MBS reception exceeds a predetermined time, and the second condition indicates that the number of consecutive failures in MBS reception exceeds a predetermined number. Alternatively, the UE 100 may request the gNB 200 to provide the HFN in response to a third condition being satisfied. The third condition indicates that the UE 100 does not have information of the current (latest) HFN. For example, the UE 100 may request the gNB 200 to provide the HFN when the UE 100 does not have the information of the current HFN because the UE 100 is interested in or starts midway receiving the broadcast session. A configuration example of a signal for the request like this is described in a fourth example.

In step S1, the receiving PDCP entity 101 of the UE 100 may receive the PDCP control PDU including the HFN or the PDCP data PDU including the HFN in the header from the transmitting PDCP entity 201 of the gNB 200. In the PHY layer, an RNTI for a plurality of UEs (e.g., G-RNTI, MCCH-RNTI, SI-RNTI, etc.) may be used for transmission of the PDCP control PDU. An RNTI for a single UE (e.g., C-RNTI) may be used for transmission of the PDCP control PDU. The UE 100 applies the HFN only at the receiving PDCP entity 101 associated with the specific MRB.

In step S1, the RRC entity of the UE 100 may receive a message (e.g., an RRC Reconfiguration message, a SIB, or an MCCH) including the HFN from the RRC entity of the gNB 200. The message may include the HFN, and an MRB identifier, MBS service identifier (e.g., TMGI) and/or a logical channel identifier (LCID) associated with the HFN. The UE 100 applies the HFN only in the receiving PDCP entity 101 associated with the MRB indicated by the MRB identifier and/or the MBS service identifier included in the message. Note that when the SIB includes the HFN, the Value Tag may not be incremented due to the HFN change.

In step S1, the MAC entity of the UE 100 may receive a MAC control element (MAC CE) including the HFN from the MAC entity of the gNB 200. In the PHY layer, an RNTI for a plurality of UEs (e.g., G-RNTI, MCCH-RNTI, SI-RNTI, etc.) may be used for transmission of the PDCP control PDU. An RNTI for a single UE (e.g., C-RNTI) may be used for transmission of the PDCP control PDU. The MAC CE may include the HFN, and an MRB identifier, MBS service identifier (e.g., TMGI) and/or a logical channel identifier (LCID) associated with the HFN. The UE 100 applies the HFN only in the receiving PDCP entity 101 associated with the MRB indicated by the MRB identifier and/or the MBS service identifier included in the message.

In step S2, the receiving PDCP entity 101 of the UE 100 determines the initial value of the PDCP state variable managed by the UE 100 (the receiving PDCP entity 101) from the HFN received from the gNB 200 in step S1 and the PDCP SN included in the PDCP data PDU the UE 100 receives from the gNB 200. For example, the UE 100 (the receiving PDCP entity 101) determines the initial value of the PDCP state variable (e.g., RX_NEXT or RX_DELIV) in accordance with a result of combining the HFN received from the gNB 200 in step S1 and the PDCP SN included in the PDCP data PDU the UE 100 receives from the gNB 200. Here, the UE 100 may determine the initial value of RX_NEXT using $(x+1)$ modulo $(2^{[sl\text{-}PDCP\text{-}SN\text{-}Size]})$, and may determine the initial value of RX_DELIV using $(x-0.5\times 2^{[sl\text{-}PDCP\text{-}SN\text{-}Size-1]})$ modulo $(2^{[sl\text{-}PDCP\text{-}SN\text{-}Size]})$ Where x represents the SN of the first received packet.

In step S3, the receiving PDCP entity 101 of the UE 100 initializes the PDCP state variable with the initial value determined in step S2. That is, the receiving PDCP entity 101 of the UE 100 sets the initial value determined in step S2 as the PDCP state variable.

Note that the UE 100 may perform the operation according to the embodiment in response to the condition concerning failing to successfully receive the MBS data (PDCP data PDU) (for example, any one of the above-described first to third conditions) being satisfied. That is, the UE 100 may perform the operation according to the embodiment under a situation in which the PDCP state variable can be determined to be possibly desynchronized. When none of the first to third conditions are satisfied, the UE 100 may ignore or discard the HFN received from the gNB 200 in step S1.

According to the operation of the embodiment, even when the UE 100 cannot start the MBS reception at the time when the gNB 200 starts providing an MBS session, the PDCP state variable can be synchronized between the gNB 200 (the transmitting PDCP entity 201) and the UE 100 (the receiving PDCP entity 101) to appropriately perform the above-described PDCP layer operation.

The operation according to the embodiment is not limited to being performed by a UE 100 starting the MBS reception midway of the MBS session, but may be performed by a UE 100 that has made cell change (e.g., cell reselection or handover) from another gNB 200 (another cell). The other gNB 200 (another cell) from which the cell is changed is referred to as a source, and the gNB 200 (cell) to which the cell changed is referred to as a target. When the HFN is not synchronized between the cells (between the source and the target), the UE 100 receiving the MBS data transmitted via PTM may perform the operation according to the embodiments described above.

In this case, the source and/or the target may notify the UE 100 that the HFN is not synchronized between the cells. For example, the source and/or the target may notify the UE 100 of a cell identity of a neighboring cell which has no synchronization of the HFN. Alternatively, the source and/or the target may notify the UE 100 of a cell identity of a neighboring cell which has synchronization of the HFN. Based on the notification, the UE 100 may determine whether to perform the operation according to the above-described embodiment when moving to the target (for example, when starting MBS data reception from the target). Based on the notification, the UE 100 may determine to perform the operation according to the above-described embodiment only when the HFN is determined not to be synchronized between the cells (between the source and the target).

EXAMPLE

Given the embodiment described above, first to fourth examples are described. These examples may be implemented in combination of two or more thereof.

(1) First Example

In the first example, assume that the UE 100 receives the HFN from the gNB 200 before receiving the first PDCP data PDU from the gNB 200.

First, the UE 100 stores the HFN received from the gNB 200. Second, the UE 100 receives the first PDCP data PDU from the gNB 200 after receiving the HFN from the gNB 200. Third, the UE 100 determines the initial value of each PDCP state variable from the stored HFN and the PDCP SN included in the first PDCP data PDU.

Figure 16:
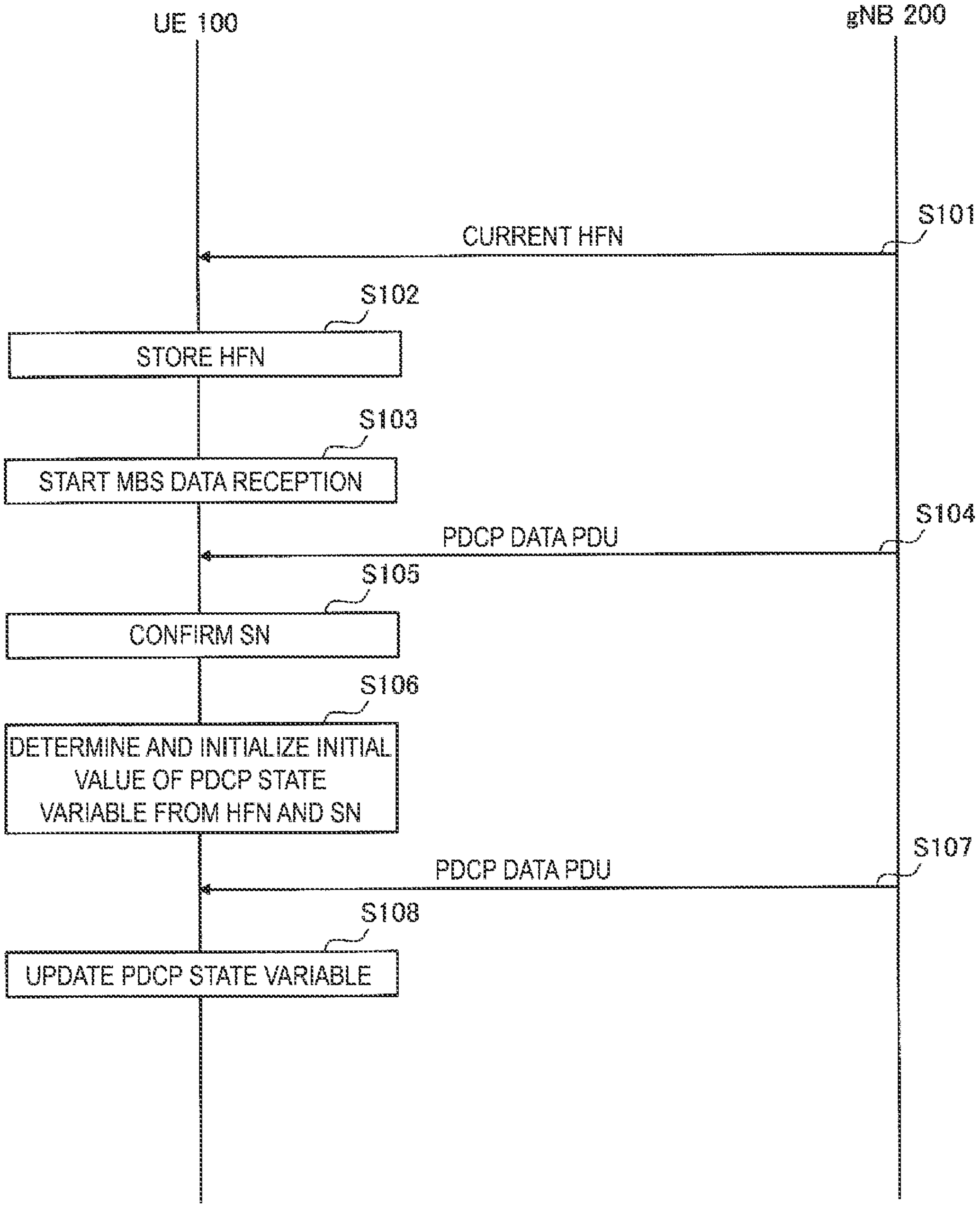
FIG. 16 is a diagram illustrating operations according to a first example.

FIG. 16 is a diagram illustrating operations according to the first example.

In step S101, the gNB 200 notifies the UE 100 of the current HFN of the MBS data. The UE 100 receives the HFN.

In step S102, the receiving PDCP entity 101 of the UE 100 stores (in the memory) the HFN received in step S101.

In step S103, the UE 100 starts receiving MBS data. Note that the gNB 200 starts transmitting the MBS data before step S103.

In step S104, the transmitting PDCP entity 201 of the gNB 200 transmits the first PDCP data PDU to the UE 100. The receiving PDCP entity 101 of the UE 100 receives the first PDCP data PDU.

In step S105, the receiving PDCP entity 101 of the UE 100 confirms the PDCP SN included in the header of the first PDCP data PDU received in step S104.

In step S106, the receiving PDCP entity 101 of the UE 100 reads (from the memory) the HFN stored in step S102. Then, the receiving PDCP entity 101 of the UE 100 determines the initial value of each PDCP state variable from the read HFN and the PDCP SN confirmed in step S105, and initializes the PDCP state variable. After completing the initialization of the PDCP state variables, the UE 100 may delete (discard) the stored HFN from the memory.

In step S107, the transmitting PDCP entity 201 of the gNB 200 transmits the second and subsequent PDCP data PDUs to the UE 100. The receiving PDCP entity 101 of the UE 100 receives the second and subsequent PDCP data PDUs.

In step S108, the receiving PDCP entity 101 of the UE 100 updates the PDCP state variables in accordance with the PDCP data PDUs received in step S107.

(2) Second Example

In the second example, assume that the UE 100 receives the HFN from the gNB 200 after receiving at least one PDCP data PDU from the gNB 200. For example, in a situation in which PTM data transmission is already performed for another UE 100, when the UE 100 enters (starts receiving) the session late, data reception may precede HFN reception.

First, the UE 100 receives at least one PDCP data PDU from the gNB 200 before receiving the HFN from the gNB 200. Second, the UE 100 stores the at least one PDCP data PDU. Third, after receiving the HFN from the gNB 200, the UE 100 determines the initial value of each PDCP state variable from the HFN and the PDCP SN included in the first PDCP data PDU among the stored PDCP data PDUs.

That is, the UE 100 suspends processing of the MBS data received before the HFN is provided (stores data), initializes the PDCP state variables at the time when the HFN is provided, and starts the data reception processing (PDCP processing).

Figure 17:
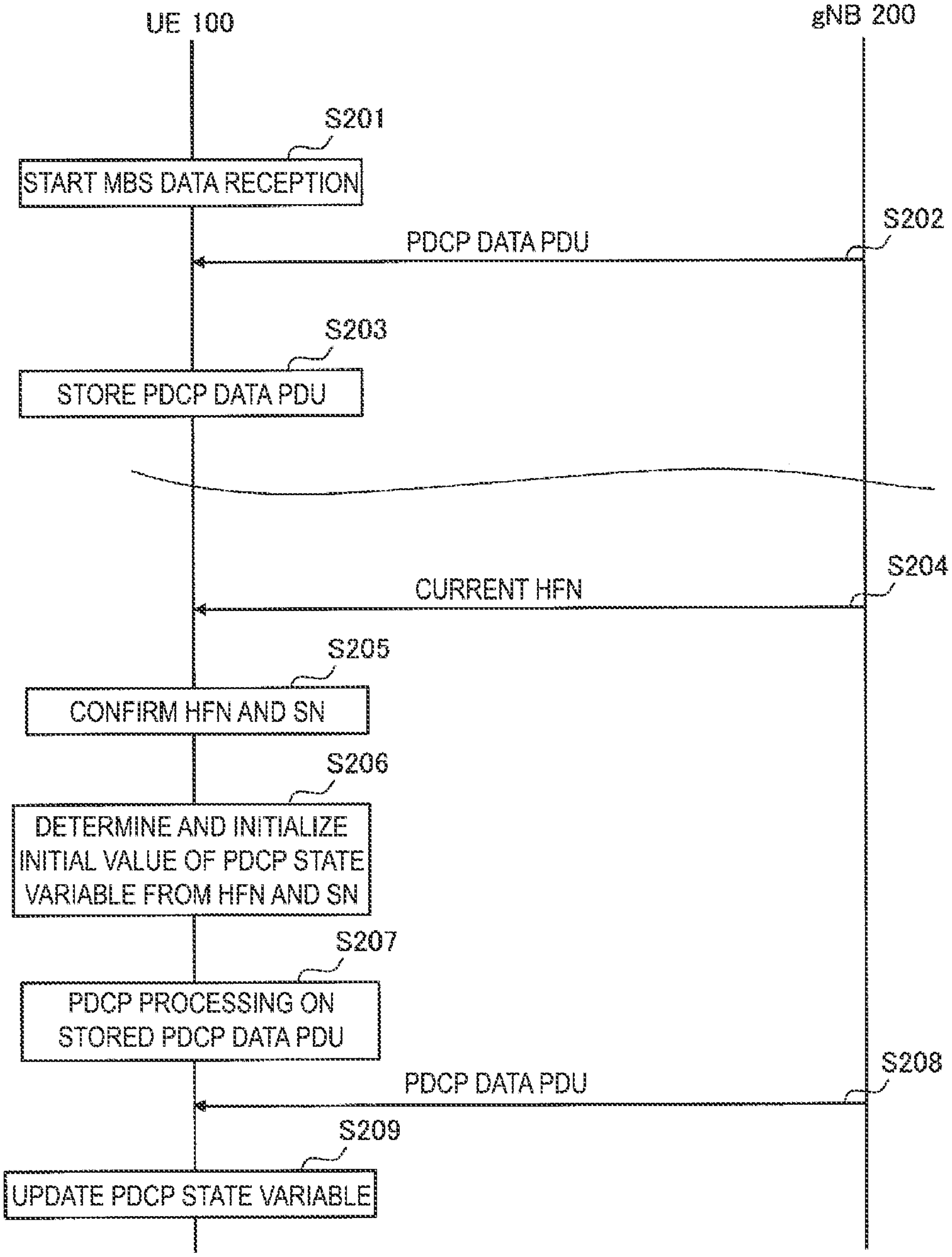
FIG. 17 is a diagram illustrating operations according to a second example.

FIG. 17 is a diagram illustrating operations according to the second example.

In step S201, the UE 100 starts receiving the MBS data in a situation in which the PDCP state variables are not initialized yet.

In step S202, the transmitting PDCP entity 201 of the gNB 200 transmits at least one PDCP data PDU constituting the MBS data to the UE 100. The receiving PDCP entity 101 of the UE 100 receives the at least one PDCP data PDU.

In step S203, the receiving PDCP entity 101 of UE 100 stores the PDCP data PDU received in step S202 in a buffer at a stage before performing the PDCP processing. For example, assume that the receiving PDCP entity 101 has the buffer at a stage before performing the PDCP processing (specifically, a stage immediately after input of the PDCP entity and before performing the above-described PDCP reception processing). The receiving PDCP entity 101 of the UE 100, when receiving a plurality of PDCP data PDUs in step S202, may store the PDCP data PDUs in the buffer in the order of reception. The receiving PDCP entity 101 of the UE 100, when receiving a plurality of PDCP data PDUs in step S202, may rearrange the PDCP data PDUs in ascending (or descending) order of PDCP SN of the PDCP data PDU and store the PDCP data PDUs in the buffer.

In step S204, the gNB 200 notifies the UE 100 of the current HFN. The UE 100 receives the HFN.

In step S205, the receiving PDCP entity 101 of the UE 100 confirm the HFN received in step S204 and the PDCP SN included in the first PDCP data PDU stored in step S203. Here, the receiving PDCP entity 101 of the UE 100, when storing a plurality of PDCP data PDUs in step S203, may acquire the PDCP SN from the PDCP data PDU having the smallest PDCP SN or the PDCP data PDU having the largest PDCP SN. Alternatively, the receiving PDCP entity 101 of the UE 100 may acquire the PDCP SN from the first received PDCP data PDU.

In step S206, the receiving PDCP entity 101 of the UE 100 determines the initial value of each PDCP state variable from the HFN and PDCP SN confirmed in step S205, and initializes the PDCP state variables.

In step S207, the receiving PDCP entity 101 of the UE 100 sequentially performs PDCP processing on the at least one PDCP data PDU stored in the buffer in step S203.

In step S208, the transmitting PDCP entity 201 of the gNB 200 transmits the PDCP data PDU to the UE 100. The receiving PDCP entity 101 of the UE 100 receives the PDCP data PDU.

In step S209, the receiving PDCP entity 101 of the UE 100 updates the PDCP state variables in accordance with the PDCP data PDU received in step S208.

(3) Third Example

The first and second examples described above mainly assume that the PDCP data PDU and the HFN are separately provided from the gNB 200, and thus a providing timing gap occurs between the provided HFN and PDCP data PDU. Therefore, when the gNB 200 transmits the HFN at a timing near when the PDCP SN wraps around, the HFN may be possibly desynchronized (HFN desync may occur) between the gNB 200 and the UE 100.

Such an issue can be resolved by transmitting the HFN in the header of the PDCP data PDU. In the third example, the UE 100 receives the HFN simultaneously with receiving the PDCP data PDU from the gNB 200. Specifically, the UE 100 receives from the gNB 200 the PDCP data PDU with the header including the HFN. However, when the HFN is always included in the header, the overhead increases. In the third example, a variable format (e.g., a variable header) is introduced so that the HFN can be dynamically inserted. For example, the header of the PDCP data PDU is configured to be able to include a flag indicating that the header includes the HFN.

Figure 18:
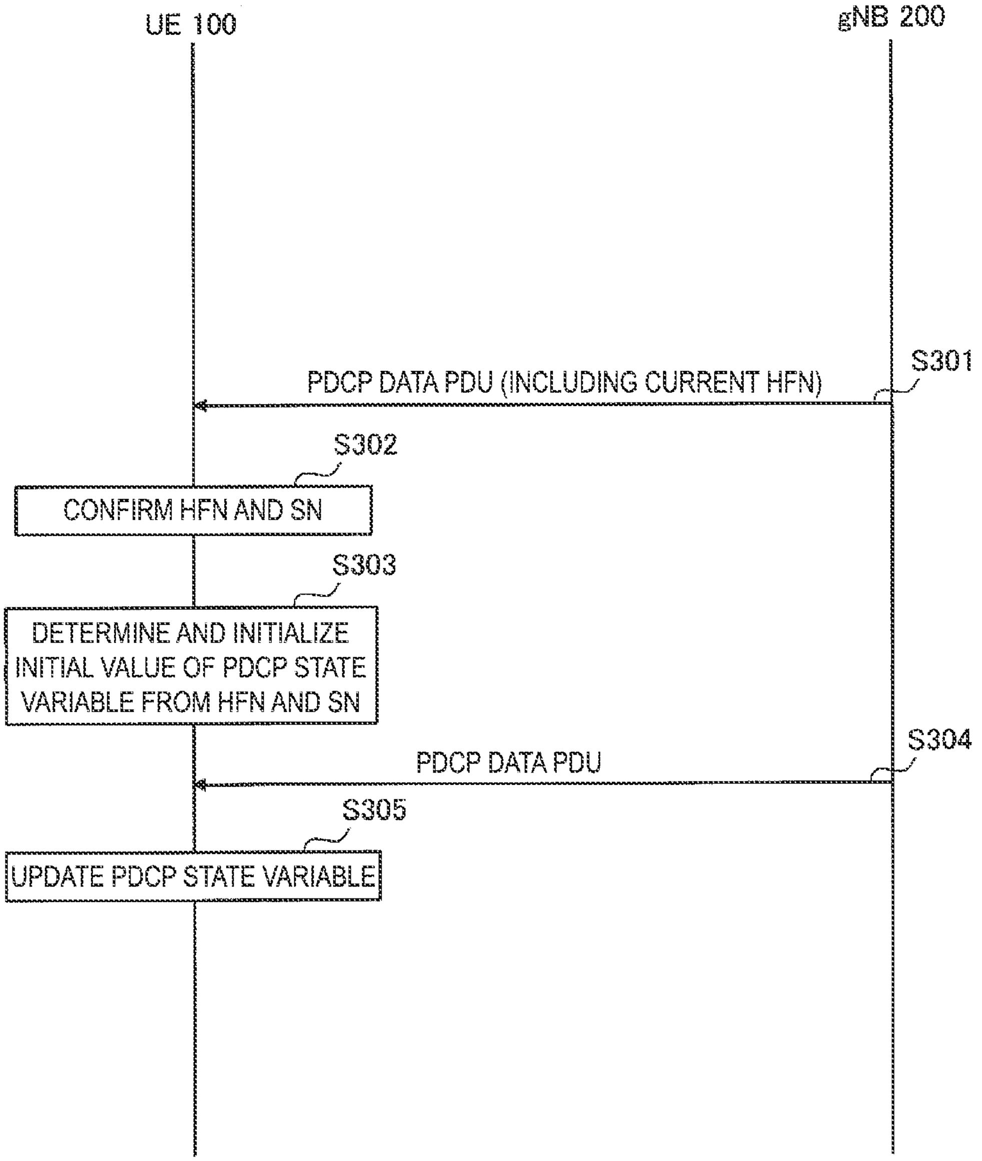
FIG. 18 is a diagram illustrating operations according to a third example.

FIG. 18 is a diagram illustrating operations according to the third example. Assume that the UE 100 is receiving or is interested in receiving MBS data transmitted via PTM.

In step S301, the transmitting PDCP entity 201 of the gNB 200 transmits to the UE 100 the PDCP data PDU with the header including the current HFN. The receiving PDCP entity 101 of UE 100 receives the PDCP data PDU.

Prior to step S301, the receiving PDCP entity 101 of the UE 100 may wait for receiving the PDCP data PDU with the header including the HFN. The receiving PDCP entity 101 of the UE 100 may wait for the PDCP data PDU only when being configured by the gNB 200 to use the PDCP data PDU. Such a configuration may be made through RRC signalling.

The PDCP data PDU with the header including the HFN may be defined as a PDCP data PDU having a format different from that of the PDCP data PDU not including the HFN.

For example, an existing PDCP data PDU may be defined when no HFN is included, and a PDCP MRB data PDU may be defined when a HFN is included.

In step S302, the receiving PDCP entity 101 of the UE 100 confirms the HFN and SN included the PDCP data PDU received in step S301.

In step S303, the receiving PDCP entity 101 of the UE 100 determines the initial value of each PDCP state variable from the HFN and PDCP SN confirmed in step S302, and initializes the PDCP state variables.

In step S304, the transmitting PDCP entity 201 of the gNB 200 transmits the PDCP data PDU to the UE 100. The PDCP data PDU may not include the HFN. The receiving PDCP entity 101 of the UE 100 receives the PDCP data PDU.

In step S305, the receiving PDCP entity 101 of the UE 100 updates the PDCP state variables in accordance with the PDCP data PDU received in step S304.

Figure 19:
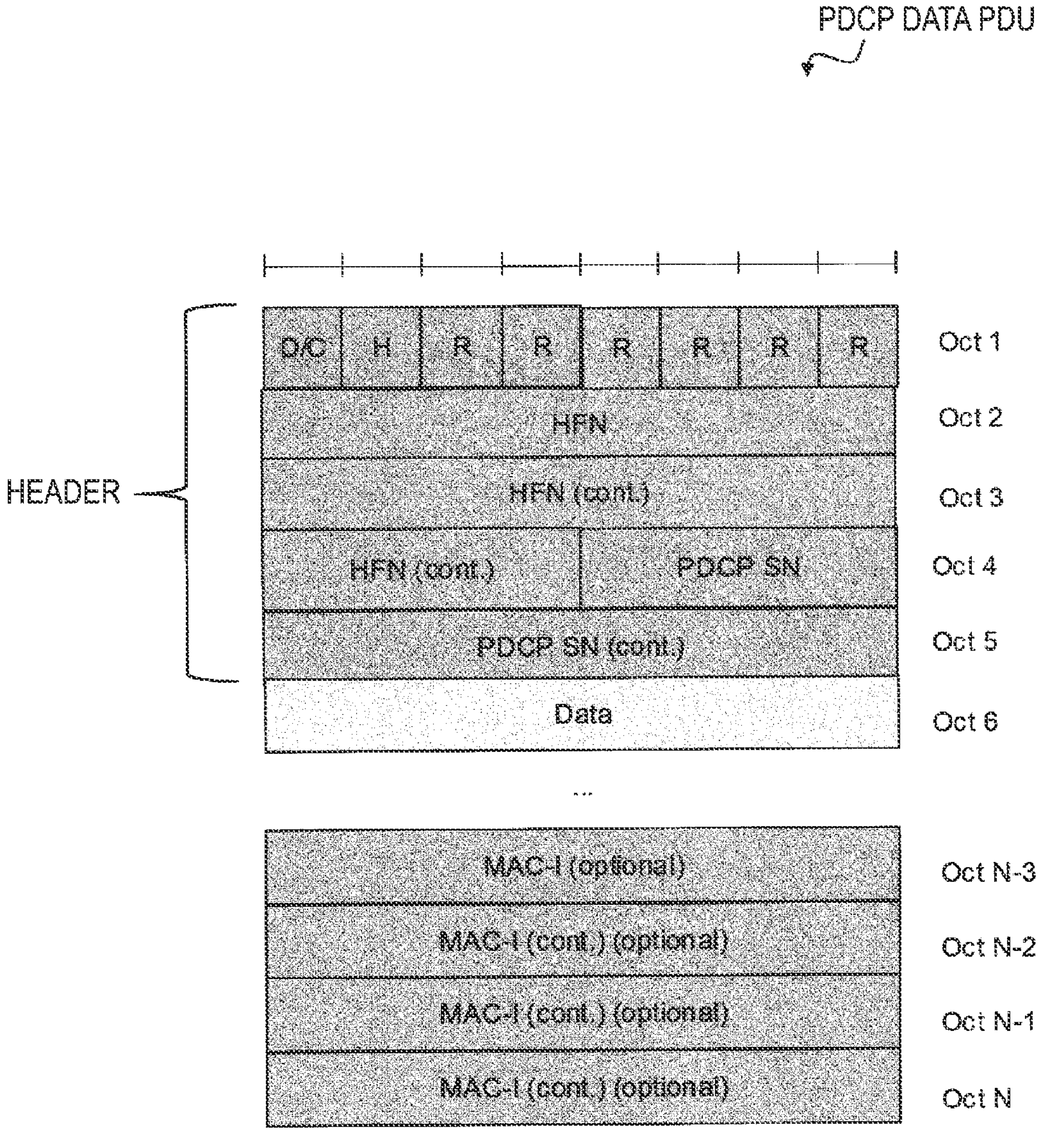
FIG. 19 is a diagram illustrating a PDCP data PDU according to the third example.

FIG. 19 is a diagram illustrating the PDCP data PDU according to the third example. The PDCP data PDU including the HFN illustrated in FIG. 19 may be defined as a PDCP MRB data PDU. FIG. 19 illustrates an example in which the bit length of the PDCP SN is 12 bits.

In the PDCP data PDU illustrated in FIG. 19, "Oct 1" has a 1-bit "D/C" field indicating whether the PDU is a control PDU or a data PDU, and a 1-bit "H" field. The "H" field set to "1" indicates a format including an HFN, and the "H" field set to "0" indicates a format including no HFN, that is, an existing PDCP data PDU format. In the existing PDCP data PDU, the "H" field is the reserved field "R", so is typically set to "0". In the PDCP data PDU illustrated in FIG. 19, "Oct 2" to a first half of "Oct 4" are set to the HFN. In the PDCP data PDU illustrated in FIG. 19, a second half of "Oct 4" to "Oct 5" are set to the PDCP SN. Then, data is stored in "Oct 6" and subsequent fields.

In the format example illustrated in FIG. 19, the HFN field is located before the PDCP SN field, but the HFN field may be located after the PDCP SN field. Although FIG. 19 illustrates the format example in which the HFN field is provided in the header, the HFN field may be provided after the data or after a MAC-I field. In this case, in a manner the same as and/or similar to the format illustrated in FIG. 19, whether the HFN field is included may be notified by the "H" field.

(4) Fourth Example

When the UE 100 fails in the PTM reception for a certain time period due to a coverage hole, interference, or the like, or when the UE 100 enters another cell (handover, cell reselection), the UE 100 may not successfully receive the PDCP data PDU. In these cases, the PDCP state variables may be desynchronized and the current HFN and/or the PDCP SN value may not be known.

However, when a duration of failure reception is not so long, since the HFN is still synchronized with that of the gNB 200, initialization of only the PDCP SN part may be possibly sufficient. For example, when the HFN upon the failure reception is applied without change and the PDCP processing fails, applying the HFN incremented by "+1" may possibly cause the COUNT value to be synchronized with that of the gNB 200 to successfully resume the reception.

However, this may not hold for when the duration of failure reception is long. In the fourth example, the UE 100 initializes the PDCP state variables when the UE 100 cannot successfully receive the PDCP data PDU.

In the fourth example, the UE 100 may transmit to the gNB 200 the request signal to request for providing the HFN in response to the first condition and/or the second condition being satisfied. The first condition indicates that a duration of consecutive failures in MBS reception exceeds a predetermined time, and the second condition indicates that the number of consecutive failures in MBS reception exceeds a predetermined number. The UE 100 receives the HFN transmitted from the gNB 200 in response to the request signal.

In the fourth example, the UE 100 may initialize each PDCP state variable with the initial value in response to the first condition and/or the second condition being satisfied.

Figure 20:
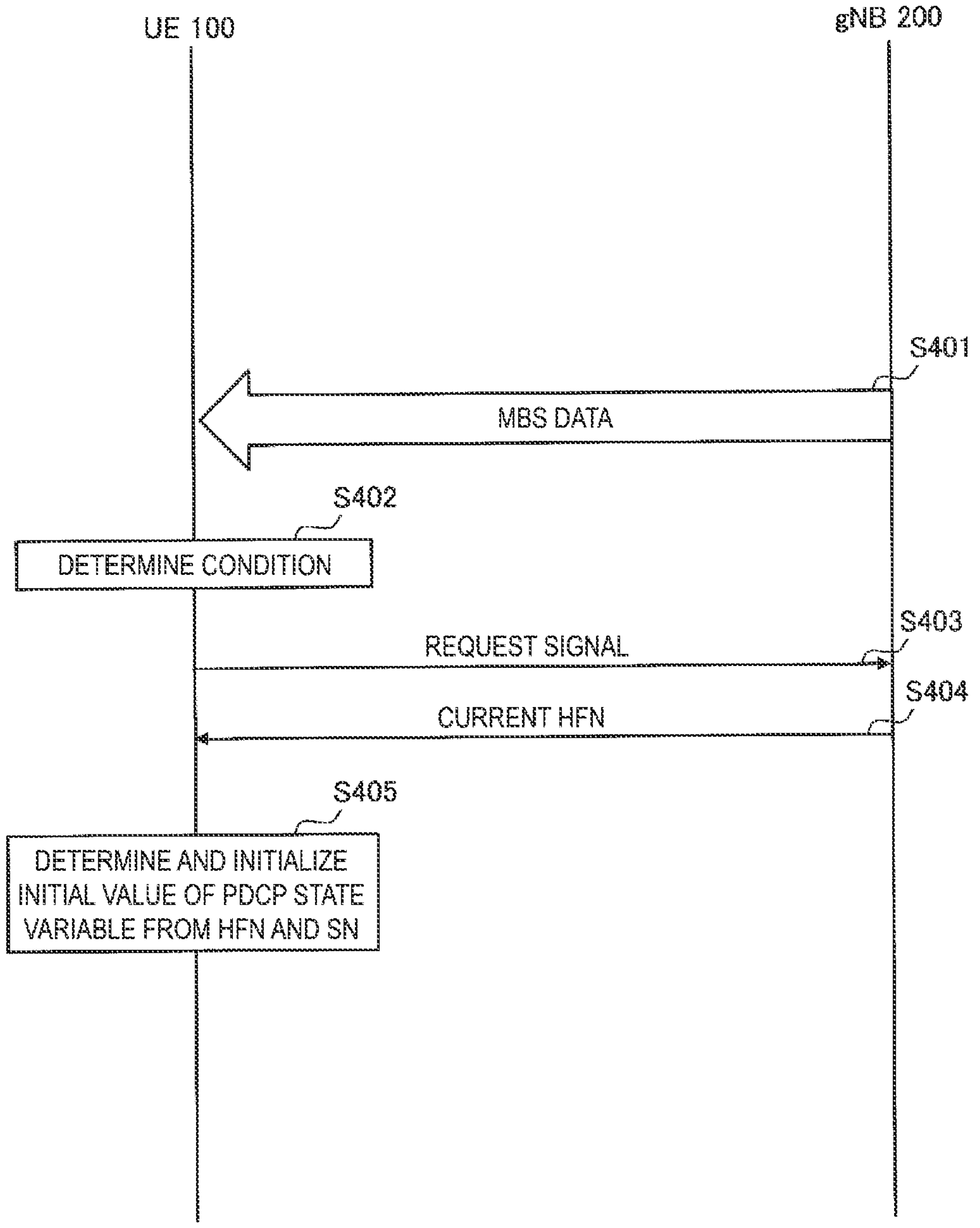
FIG. 20 is a diagram illustrating operations according to a fourth example.

FIG. 20 is a diagram illustrating operations according to the fourth example.

In step S401, the UE 100 performs MBS data reception (PTM reception) from the gNB 200.

In step S402, the UE 100 determines whether a predetermined condition concerning failing to successfully receive the MBS data (PDCP data PDU) being satisfied. For example, the UE 100 determines whether the first condition and/or the second condition is satisfied. The first condition indicates that a duration of consecutive failures in MBS reception exceeds a predetermined time, and the second condition indicates that the number of consecutive failures in MBS reception exceeds a predetermined number. Here, the UE 100 may make determination only for failure reception in PTM (-leg).

In the determination of the first condition, the UE 100 may use a timer to detect failures in reception for a certain time period. For example, the UE 100 measures a duration of consecutive failure receptions. The UE 100, upon the failure reception, sets the timer to a certain time period (set value) and starts the timer. The set value of the timer may be configured for the UE 100 from the gNB 200. The UE 100 may manage the timer separately for each G-RNTI or for each MTCH, for example. The UE 100 stops the timer upon successful reception. On the other hand, when the timer expires, the UE 100 may determine to perform the initialization processing of the PDCP state variables.

In the determination of the second condition, the UE 100 may use a counter to detect failures in reception a certain number of times. For example, the UE 100 operates the counter for each MTCH reception opportunity to measure the number of consecutive failure receptions. The UE 100, upon the failure reception, increments the counter by one. The UE 100 may manage the counter separately for each G-RNTI or for each MTCH, for example. The UE 100, upon the successful reception, initializes the count value of the counter to 0. On the other hand, when the count value of the counter exceeds a threshold, the UE 100 may determine to perform the initialization processing of the PDCP state variables. The threshold may be configured for the UE 100 from the gNB 200.

The UE 100 may make the determination in combination of the timer and the counter. The UE 100 performs the initialization processing of the PDCP state variables when the number of failure receptions occurring within a certain time period exceeds a threshold. For example, the UE 100 starts the timer and sets the counter to 0 at a certain time. The UE 100 increments the counter by one for each failure reception while the timer is operating. When the timer expires, the UE 100 restarts the timer and sets the counter to 0. On the other hand, when the counter exceeds the threshold, the UE 100 may determine to perform the initialization processing of the PDCP state variables.

In step S402, UE 100 may detect a possible desynchronization of the PDCP state variable (HFN, PDCP SN). For example, when the COUNT value stored in the receiving PDCP entity 101 is different from the COUNT value derived from the PDCP SN included in the received PDCP data PDU (the two COUNT values are different from each other by a certain value or more), the UE 100 may determine to perform the initialization processing of the PDCP state variables. Here, when failing in the security processing (deciphering/integrity verification) using the COUNT value configured by use of the HFN stored in the receiving PDCP entity 101 and the PDCP SN of the received packet, the UE 100 may determine to perform the initialization processing of the PDCP state variables.

In step S402, the UE 100, when starts receiving in the target of which the PDCP state variable (HFN, PDCP SN) is not synchronized with that of the source, may determine to perform the initialization processing of the PDCP state variable.

Note that the condition determination in step S402 may be performed in any of the PDCP/RLC/MAC layers, and the determination result may be notified to the RRC.

In step S403, the UE 100 transmits the request signal to request for providing the current HFN to the gNB 200. The request signal may be RRC signalling such as a UE Assistance Information message and an MBS Interest Indication message. The request signal may be a PDCP control PDU, a PDCP data PDU or a MAC CE. The request signal may be a random access preamble transmitted using a special PRACH resource (a special time/frequency resource or a special preamble sequence). The method of using the random access preamble as the request signal is suitable for the UE 100 in the RRC idle state or the RRC inactive state.

When the RRC signalling or the MAC CE is used as the request signal, the request signal may include an MRB identifier for identifying the MRB of which the HFN is to be provided. The request signal may also include an MBS session identifier (e.g., TMGI) identifying the MBS session for which the HFN is to be provided. The request signal may also include a logical channel identifier (LCID) identifying the logical channel for which the HFN is to be provided. When the PDCP data PDU is used as the request signal, the request signal may be a PDCP data PDU with the header in which a flag bit indicating that the HFN is requested to be provided is set to "1".

In step S404, the gNB 200 notifies to the UE 100 of the current HFN in response to the request signal received from the UE 100 in step S403. The UE 100 receives the HFN.

Here, when the HFN is broadcast by way of the SIB, the MCCH, or the like, another UE other than the UE 100 that transmits the request signal (that is, a UE that does not need the initialization of the PDCP state variables) may also receive the HFN. The other UE that can successfully perform the MBS reception, even receiving the HFN, may ignore or discard the received HFN and may not use the HFN to initialize the PDCP state variable.

In step S405, the UE 100 determines the initial value of each PDCP state variable from the HFN received in step S404 and the PDCP SN included in the received PDCP data PDU, and initializes the PDCP state variable. Subsequent operations are the same as and/or similar to those in the above-described examples.

Other Embodiments

The operation flows described above can be separately and independently implemented, and also be implemented in combination of two or more of the operation flows. For example, some of the steps in one operation flow may be applied to another operation flow. Some of the steps of one operation flow may be replaced with some of the steps of another operation flow.

In the embodiments and examples described above, an example in which the base station is an NR base station (i.e., a gNB) is described; however, the base station may be an LTE base station (i.e., an eNB) or a 6G base station. The base station may be a relay node such as an Integrated Access and Backhaul (IAB) node. The base station may be a DU of the IAB node. The user equipment may be a Mobile Termination (MT) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing processing performed by the UE 100 or the gNB 200 may be integrated, and at least a part of the UE 100 or the gNB 200 may be implemented as a semiconductor integrated circuit (chipset, System on a chip (SoC)).

Embodiments have been described above in detail with reference to the drawings, but specific configurations are not limited to those described above, and various design variation can be made without departing from the gist of the present disclosure.

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Supplementary Note

1. Introduction

In RAN2 #115e, the work item of the NR multicast and broadcast service (MBS) was achieved in the following agreement on the multicast service continuity.

In RRC signalling, one MRB can be configured with PTM only, PTP only, or both PTM and PTP. Either PTM, PTM+PTP, or PTP only can be changed by the RRC signalling.

In the RRC signalling, DL with only UM RLC configuration for PTM, DL and UL AM RLC configuration for PTP, and DL with only UM RLC configuration for PTP are supported. Supporting DL and UL UM RLC configurations for PTP requires further study.

Whether or not the PDCP SR is generated due to the bearer type change of the RRC signal and the generation method of the PDCP SR when the PDCP SR is generated will be further studied.

Inactivation/activation of PTM beyond RRC reconfiguration according to the above first agreement is not supported.

In the set of PTM PDCP state variables being configured, the SN part of the COUNT value of these variables is set according to the SN of the packet first received (by the UE) and optionally the HFN indicated by the gNB.

The PTM RLC entity of the MRB configuration is initialized and the values of RX_Next_Highest and RX_Next_Reassembly are set according to the SN of the first received packet including the SN.

With the MRB configuration, the ORLC state variable of the PTP RLC receive window can be set to an initial value (0).

In this supplementary note, the remaining problems related to the multicast service continuity is discussed.

2. Discussion 2.1. PDCP Status Report Upon Bearer Type Change

RAN2 #115e agreed to the following open issues.

In the RRC signalling, DL with only UM RLC configuration for PTM, DL and UL AM RLC configuration for PTP, and DL with only UM RLC configuration for PTP are supported. Supporting DL and UL UM RLC configurations for PTP requires further study.

Whether or not the PDCP SR is generated due to the bearer type change of the RRC signal and the generation method of the PDCP SR when the PDCP SR is generated will be further studied.

According to current PDCP specifications, PDCP status report is triggered by RRC upon occurrence of the following events, mainly for AM DRBs (and possibly UM DRBs).

For AM DRB configured by a higher layer to transmit a PDCP status report in the uplink (statusReportRequired in TS38.331), the receiving PDCP entity needs to trigger the PDCP status report in the following cases.

The higher layer requests PDCP entity re-establishment.

The higher layer requests PDCP data recovery.

The higher layer requests uplink data switching.

The higher layer reconfigures the PDCP entity to release the DAPS, and daps-SourceRelease is configured according to TS 38.331.

For UM DRB configured by a higher layer to transmit a PDCP status report in the UL (statusReportRequired in TS38.331), the receiving PDCP entity needs to trigger the PDCP status report in the following cases.

The higher layer requests uplink data switching.

In the MBS, the PTM-only MRB is configured with only RLC UM, whereas the PTP-only MRB and the PTP-leg of split MRB are configured with RLC UM or RLC AM. These are referred to as UM MRB and AM MRB, respectively.

According to the current RRC specifications, the performance requirement of the UE with respect to the processing delay of RRC reconfiguration is defined as the 10 ms. Therefore, the UE may miss the MBS transmission during the RRC reconfiguration forbearer type change, and the missing packets need to be compensated after the bearer type change. In this sense, the PDCP status reports should be supported at least to meet the higher reliability required by a particular MBS service.

It is also worth studying when a PDCP status report is needed. Since the AM MRB generally assumes a "high QoS" MBS service, reliability is obviously required also for the bearer type change. The bearer type change between AM MRBs includes the bearer type change from a UM MRB to an AM MRB.

Proposal 1: RAN2 should agree that PDCP status report is supported for lossless bearer type change at least between AM MRBs and from a UM MRB to an AM MRB.

In general, a UM NMRB is considered not to require reliability, i.e., lossless, upon bearer type change. However, whether a UM MRB is used for a "high QoS" MBS service can actually be left to the implementation of the NW. The NW can efficiently operate the resources by using the PTM-only MRB for the UE in a good radio state and reconfiguring the PTP-only MRB (or the split MRB) when the radio state deteriorates to a certain level or less. Given that in the current specifications a UM DRB is allowed to trigger a PDCP status report in some cases, it is readily apparent that whether the NW needs a PDCP status report can be configured for the UM MRB. In this case, the PTP-only MRB and the PTP-leg of split MRB need to be configured with a DL/UL bi-directional UM, i.e. a DL RLC entity for MBS data reception and a UL RLC entity for PDCP status report transmission.

Proposal 2: RAN2 should agree that it is up to the NW implementation whether to use the PDCP status report upon bearer type change of the UM MRB. To this end, a specification is required for configuring the PTP with a DL/UL bi-directional RLC UM.

2.2. PTM PDCP/RLC State Variables 2.2.1. Initial Value

RAN2 #115e agreed to the following statements.

In the set of PTM PDCP state variables being configured, the SN part of the COUNT value of these variables is set according to the SN of the packet first received (by the UE) and optionally the HFN indicated by the gNB.

The PTM RLC entity of the MRB configuration is initialized and the values of RX_Next_Highest and RX_Next_Reassembly are set according to the SN of the first received packet including the SN.

The term "according to" in the two contracts intends the following three options.

Option 1: The initial value of each state variable is simply set to the SN of the first received packet.

Option 2: Rel-16 V2X solution is reused.

For PDCP "RX_NEXT", "the initial value of the SN part of RX_NEXT is (x+1) modulo ($2^{[sl\text{-}PDCP\text{-}SN\text{-}Size]}$) where x is the SN of the first received PDCP data PDU". For PDCP "RX_DELIV", "the initial value of the SN part of RX_DELIV is ($x-0.5\times2^{[sl\text{-}PDCP\text{-}SN\text{-}Size-1]}$) modulo ($2^{[sl\text{-}PDCP\text{-}SN\text{-}Size]}$) where x is the SN of the PDCP Data PDU first received".

RLC UM "RX_Next_Reassembly" is "initialized to the SN of the first received UMD PDU containing the SN".

RLC UM "RX_Next_Highest" is "initialized to the SN of the first received UMD PDU containing the SN".

Option 3: A new mechanism for RLC UM is introduced.

For the PDCP state variables, either Option 1 or 2 can be applied.

RLC UM "RX_Next_Reassembly" is "initialized to a value prior to "RX_Next_Highest".

RLC UM "RX_Next_Highest" is "initialized to the SN of the first received UMD PDU containing the SN" as in Option 2 above.

For the PDCP state variable, in Option 2, the next received packet, RX_NEXT, is set to ([the SN of the first received packet]+1). The packet not first delivered to a higher layer, RX_DELIV, is set to ([the SN of first received packet]−[¼ of the SN length]). This means that reordering can be performed even if an older packet is received after the first received packet. Therefore, Option 2 is considered to be more reliable than Option 1.

Proposal 3: RAN2 should agree, for the PDCP, that the initial value of RX_NEXT is ([the SN of the first received packet]+1) modulo (2^[the PDCP SN length]), as in Rel-16 V2X.

Proposal 4: RAN2 should agree, for the PDCP, that the initial value of RX_DELIV is {[the SN of the first received packet]−2^([the PDCP SN length]−2)} modulo (2[the PDCP SN length]), as in Rel-16 V2X.

For the RLC state variables, Options 1 and 2 are exactly the same. Options 2 and 3 are also the same in terms of RX_Next_Highest. Therefore, RAN2 may confirm that no other solutions are present for the initial value of RX_Next_Highest.

Proposal 5: RAN2 should agree to RLC UM that the initial value of RX_Next_Highest is the SN of the first received packet, as in Rel-16 V2X.

With respect to RX_Next_Reassembly, Options 2 and 3 are different. The advantages of Option 3 are similar to Option 2 for the PDCP state variables. That is, an older packet received after the first received packet can be prevented from being discarded. This problem is also pointed out to occur only when RLC segmentation is performed, but minimization of packet loss, if possible, is always good.

Proposal 6: RAN2 should discuss for RLC UM whether the initial value of RX_Next_Reassembly is the SN of the first received packet (same as in Rel-16 V2X) or the value prior to RX_Next_Highest.

2.2.2. HFN Provisioning

1) Whether SA3 uses the HFN for security, 2) whether PDCP status report is supported because COUNT has the HFN part, as described in RAN2 #115e, etc. The PDCP status report is already agreed to be supported for handover and will also be supported for the bearer type change as in chapter 2.1. Therefore, the HFN needs to be indicated by the gNB as agreed by RAN2.

Then, it should be discussed how the gNB provides the HFN to the UE. As a method of providing the HFN, the following options can be considered.

Alt. 1: RRC reconfiguration

Alt. 2: PDCP control PDU

Alt. 3: MCCH

Alt. 4: SIB

Alt. 5: Header of PDCP data PDU

Alt. 1 is considered simple because the gNB needs to configure the MRB for multicast to the UE by RRC reconfiguration, i.e. the HFN is configured together with the MRB. However, since the RRC reconfiguration is dedicated signalling for a specific UE and is basically used only in the first delivery mode (Delivery mode 1: DM1), thus, the processing is a little heavier than Alt. 2, which is disadvantageous. A certain timing gap is between the reception of the RRC reconfiguration and the first received packet, which may cause HFN un-synchronization. Further, additional information may be needed to indicate to which MRB the HFN applies.

Alt. 2 is considered to be a lighter and more efficient signalling because the gNB can indicate the HFN on the PTM. Since the PDCP entity is associated with the MRB, the additional information of mapping between the HFN to the MRB is not required. That is, the PDCP entity that receives this PDCP control PDU may apply the HFN as an initial value. This is generally used in the first delivery mode and the second delivery mode (Delivery mode 2: DM2). The timing gap between the PDCP control PDU and the first received packet can be minimized because the same PDCP entity processes these PDCP PDUs. However, the PDCP control PDU may not be security-protected.

Alt. 3 is another possibility, but the MCCH is only applicable to the second delivery mode, and it may not be preferable to oblige the UE receiving the first delivery mode to acquire the MCCH as the additional burden. A certain timing gap may be between the reception of the MCCH and the first received packet. Furthermore, as in Alt. 1, the additional information of mapping between the HFN to the MRB may be required, and thus it is not preferable to oblige acquisition of the MCCH.

Alt. 4 is considered as a normal provisioning method. Although the SIB basically applies to both the first delivery mode 1 and the second delivery mode, it is still unclear whether a UE connected for multicast reception is obligated to monitor the SIB. The concern is that the SIB is not security-protected as in Alt. 2, the additional information of mapping between the HFN and the MRB occurs as in Alt. 1, and a certain timing gap occurs between the SIB reception and the first received packet. When applying on-demand SI, the UE needs to transmit an on-demand SI request message before acquiring the SIB, which may cause a delay of HFN initialization.

Alt. 5 shows advantages as in Alt. 2. That is, deliver with PTM is possible and no additional information is required, which is a common solution for the first delivery mode and the second delivery mode. In Alt. 5, the first received packet carries the HFN together, thus the most important advantage is theoretically the timing gap. However, assuming that the header of the first received packet includes the HFN, it is questionable how the gNB knows the first received packet of the UE given that the packet is beginning to be transmitted to other UEs via PTM. Otherwise, the gNB always needs to include the HFN in each data packet. The concern is that the PDCP header is not security-protected as in Alt. 2. The HFN provisioning is considered as C-plane signalling like other alternatives including Alt. 2, and thus, is a bit strange from a concept/principle point of view. On the other hand, Alt. 5 uses U-plane data.

When viewed from another angle, it can be seen that the HFN provisioning method is different between the first delivery mode (DM1) and the second delivery mode (DM2). In general, the DM1 (or multicast) is more secure than the DM2 (or broadcast). This is because the configuration is provided through dedicated signalling (and a session join procedure is available in NAS). In this sense, the HFN also needs to be securely provided in the DM1. In this case, Alt. 1 is the simplest solution, but is not suitable for realizing commonality between the DM1 and the DM2. Alt. 2 is assumed to be able to ensure a certain degree of security compared to Alt. 3, Alt. 4, and Alt. 5 when the PDCP control PDU is transmitted with the C-RNTI. On the other hand, the DM2 should not oblige the UE to transition to CONNECTED but is only for the purpose of acquiring the HFN. To support the DM2, the HFN is periodically provided in a broadcast manner (i.e., using G-RNTI, MCCH-RNTI, or SI-RNTI).

As noted above (as also summarized in a table below), it can be said that providing the HFN via the PDCP control PDU (i.e., Alt. 2) is slightly preferred, in which performance and security are balanced and which is a common solution for both delivery modes (i.e., the DM1 and the DM2).

Proposal 7: RAN2 should agree that the initial value of the HFN is provided via the PDCP control PDU.

Proposal 8: When Proposal 7 is agreeable, RAN2 should further agree that the PDCP control PDU (for HFN provisioning) can be transmitted together with G-RNTI and C-RNTI.

TABLE 1

| | Alt. 1 RRC reconfiguration | Alt. 2 PDCP control PDU | Alt. 3 MCCH | Alt. 4 SIB | Alt. 5 Header of PDCP data PDU |
|---|---|---|---|---|---|
| Point-to-multipoint provisioning | N/A | Applicable (With G-RNTI) Applicable (With C-RNTI) | Applicable (MCCH-RNTI) | Applicable (SI-RNTI) | Applicable (G-RNTI) |
| Timing gap between HFN provisioning and first received data | Large | Very small | Large | Large | No difference |
| Overhead | Middle | Small | Middle | Middle | Large (when HFN is included in all data) Small (when only first received data includes HFN) |
| Mapping information between HFN and MRB | Required | Not required | Required | Required | Not required |
| Security | High | Low (when G-RNTI is used) Middle (when C-RNTI is used) | Low | Low | Low |
| UE RRC state | Only during connection | All states | All states | All states | All states |
| Common point between DM1 and DM2 | Low | High | Low | High | High |

2.2.3. Data Reception Before HFN Initialization

The UE may receive data before receiving the HFN. This is because the reception timings of the HFN and the first received packet may differ from each other due to out-of-order delivery (e.g. retransmission in bad radio conditions and/or retransmission during handover, etc.). And/or the timings differ depending on which option in section 2.2.2 is selected. Furthermore, since the PTM transmission already starts to be transmitted to another UE, the UE can receive data as soon as the MRB is set.

Observation 1: The UE may receive MBS data via PTM before the HFN initialization.

In the current PDCP specifications, RX_NEXT and RX_DELIV are (re) set to the initial values when RRC requests PDCP entity establishment, PDCP entity re-establishment, or PDCP entity suspension. Naturally, the COUNT value is initialized before the data reception. Thus, from a PDCP perspective, the data may not be received even though the lower layers are ready for data reception. That is, even when the RLC layer transmits the RLC SDU (PDCP PDU) to the PDCP layer, the data may not be received. Even when the PDCP accepts these PDCP PDUs, these PDCP PDUs are to be discarded due to the failure in integrity verification because the HFN is still aoristic.

Observation 2: Before the initialization of the HFN, according to current specifications, PDCP PDUs from the lower layers may not be accepted or may be discarded in the PDCP layer.

Thus, all of (some) extensions of the initialization of the state variable of the SN described in section 2.2.1 and minimizing packet loss as described in section 2.2.2 are aimed at. One simple way is for the PDCP to temporarily buffer these PDUs before the PDCP processing and start processing these PDUs after the initialization of the HFN.

Proposal 9: RAN2 should discuss how the UE processes the received data packet before the initialization of the HFN.

2.2.4. Request for HFN Provisioning

Another possible issue is whether the UE is allowed to query the gNB for the current HFN. Especially for PTM-only MRB, the HFN may be un-synchronized when the UE fails to receive packets for a certain time period, e.g. due to a coverage hole or interference. Another case is that when the HFN is provided only when an MBS session is activated (as briefly described in section 2.2.2), the HFN is required when the UE later joins an already activated MBS session.

Therefore, it is convenient to allow the UE to request the gNB to provide the current HFN when the UE is aware of the need for HFN provisioning. For example, how to transmit the request via RRC signalling or a PDCP control PDU needs further study. Under the same condition, the UE may not receive the next packet that is outside the receive window. In this case, the UE may reset all state variables to initial values.

Proposal 10: RAN2 should discuss whether the UE is allowed to request the gNB to provide the current HFN of the MBS session.

Proposal 11: RAN2 should discuss whether the state variable can be reset WHEN the UE fails to receive MBS session for a certain time period.

2.3. Lossless Mobility Operation

"RAN2 aims to support lossless handover of MBS-MBS mobility for a service requiring this (at least PTP-PTP although details of scenarios are undetermined)" and "PDCP status report may be supported from the UE". These agreements mean a mechanism significantly similar to existing handover for unicast, when the MRB is configured with PTP only.

Observation 3: To support lossless handover, the existing handover mechanism for unicast cam be reused for MRB configured with only PTP.

In view of this, a study needs to be carried out on a case of handover including PTM (-leg), that is, the MRB configured with PTM only and the split MRB including the PTP leg and the PTM leg.

The split MRB can be regarded as the PTP-only MRB when the PTM leg is not used. Thus, the lossless handover can be easily supported based on existing unicast handover. In view of this, a basic procedure of the split MRB is considered as follows.

Step 1: The PTP leg of split MRB is used in the source cell as necessary due to lossless dynamic switch.

Step 2: The UE executes PTP-PTP handover (or as in unicast handover) and lossless handover.

Step 3: The PTM leg of split MRB is used in the target cell as necessary due to lossless dynamic switch.

At this time, the lossless dynamic switch ensured by the NW implementation plays an important role.

Observation 4: The lossless dynamic PTM/PTP switch is crucial for the lossless handover of the split MRB.

Regarding the PTM-only MRB, a significantly similar procedure as below can be applied.

Step 1: The PTM MRB is reconfigured to the PTP MRB (or the split MRB) in the source cell due to lossless bearer type change.

Step 2: The UE executes lossless handover as PTP-PTP handover (or as unicast handover).

Step 3: The PTP-only MRB (or the split MRB) is reconfigured to the PTM-only MRB in the target cell as necessary due to lossless bearer type change.

In this case, the lossless bearer type change described in chapter 2.1 is also important for the lossless handover.

Observation 5: The lossless bearer type change is crucial for the lossless handover of the PTM-only MRB.

From the above, the points of the basic procedures of the lossless handover are that whether the PTP leg is used or the PTM-only MRB is reconfigured (=step 1), and no enhancement is made where execution of handover is the same as existing unicast handover.

Proposal 12: RAN2 should agree that the basic lossless handover of the MRB always needs to include a PTP (-leg). That is, the PTP leg of split MRB is used or the PTM-only MRB is reconfigured to the PTP-only MRB (or the split MRB), and thereafter the handover is performed.

Proposal 13: RAN2 should agree that execution of the handover of the MRB is the same as that of unicast, that is, enhancement for basic lossless handover is not necessary.

Next, the most interesting advanced procedure is direct PTM-PTM handover. That is, the UE that receives the MBS via PTM (-leg) executes lossless handover. Signalling overhead and complexity in the basic handover procedure described above can be reduced. That is, steps 1 and 3 can be skipped. Furthermore, such a direct PTM-PTM lossless handover may be expected especially in a split MRB configured with PTP leg. That is, it is used for services that require higher reliability. However, the midpoint of Rel17 is already past, and WID only describes "support of basic mobility provided with service continuity is specified". Thus, advanced lossless handover needs to be postponed until future releases.

Observation 6: Although advanced lossless handover of the UE that receives an MBS service via PTM (-leg), that is, "direct PTM-PTM handover", may be effective for a specific service, this may need to be postponed until future releases in consideration of the remaining time of the Rel-17 time frame.

2.4. Multicast MBS Interest Indication

RAN2 assumes that MBS Interest Indication is supported in broadcast sessions but is not supported in multicast sessions. RAN2 #115e agreed to the basic content of the MBS Interest Indication as follows.

For CONNECTED

The UE reports the following MBS Interest information (as LTE SC-PTM).

MBS frequency list

Priority between reception of all listed MBMS frequencies and reception of any unicast bearers TMGI list When reporting of MBS frequencies is allowed, the MBS frequencies reported by the UE are sorted in descending order of interest in a manner the same as and/or similar to LTE SC-PTM.

For a multicast session, it is generally understood that the core network informs the gNB of the interest of the UE because the multicast session has session join procedure in a higher layer. This applies to the MBS services of interest of the UE. The gNB may know the MBS frequency and the cell providing the MBS service of interest of the UE. However, the priority between MBS reception and unicast, which is purely AS-related information, may not be provided by the core network.

Observation 7: In a multicast session, the core network provides the gNB with the MBS service that is of interest to the LUE, and the gNB may know the MBS frequency/cell. However, the core network and the gNB may not know the AS priority of the UE between MBS and unicast.

Priority information, in a manner the same as and/or similar to LTE eMBMS, is also useful for the gNB, such as scheduling and handover determinations, and may also be relevant to the service continuity. Therefore, the UE needs to inform the gNB of the priority information also for multicast sessions. In this sense, RAN2 should agree that MBS Interest Indication should also be supported for multicast service/delivery mode 1.

Proposal 14: RAN2 should agree that the MBS Interest Indication is also supported for multicast session/delivery mode 1, at least for the UE to inform the gNB of the priorities of MBS reception and unicast.

REFERENCE SIGNS

1: Mobile communication system
10: RAN
20: CN
100: UE
101: Receiving PDCP entity
110: Receiver
120: Transmitter
130: Controller
200: gNB
201: Transmitting PDCP entity
210: Transmitter
220: Receiver
230: Controller
240: Backhaul communicator

The invention claimed is:

1. A communication method performed at a user equipment, comprising:

receiving, from a network node, a radio resource control (RRC) Reconfiguration message when the user equipment is in a radio resource control (RRC) connected state, wherein the RRC Reconfiguration message configures a multicast/broadcast service (MBS) radio bearer (MRB) associated with a multicast session, and the RRC Reconfiguration message includes:

a hyper frame number (HFN) associated with the MRB;

an MRB identifier associated with the HFN; and a temporary mobile group identity (TMGI) associated with the HFN, determining a packet data convergence protocol (PDCP) state variable managed for the MRB, based on the HFN included in the RRC Reconfiguration message, wherein the determining comprises determining, based on the HFN included in the RRC Reconfiguration message, an initial value of RX_DELIV indicating an oldest PDCP service data unit (SDU) among PDCP SDUs that are to be received and have not yet been provided to a higher layer.

2. The communication method according to claim 1, wherein the RX_DELIV includes COUNT value comprising the HFN and a PDCP sequence number (SN).

3. A user equipment comprising:

a receiver configured to receive, from a network node, a radio resource control (RRC) Reconfiguration message when the user equipment is in a radio resource control (RRC) connected state, wherein the RRC Reconfiguration message configures a multicast/broadcast service (MBS) radio bearer (MRB) associated with a multicast session, and the RRC Reconfiguration message includes:

a hyper frame number (HFN) associated with the MRB;

an MRB identifier associated with the HFN; and a temporary mobile group identity (TMGI) associated with the HFN, a circuitry configured to determine a packet data convergence protocol (PDCP) state variable managed for the MRB, based on the HFN included in the RRC Reconfiguration message, and determine, based on the HFN included in the RRC Reconfiguration message, an initial value of RX_DELIV indicating an oldest PDCP service data unit (SDU) among PDCP SDUs that are to be received and have not yet been provided to a higher layer.

4. A mobile communication system comprising: the user equipment according to claim 3; and a network node.

5. A processor for a user equipment, comprising:

a receiver circuitry configured to receive, from a network node, a radio resource control (RRC) Reconfiguration message when the user equipment is in a radio resource control (RRC) connected state, wherein the RRC Reconfiguration message configures a multicast/broadcast service (MBS) radio bearer (MRB) associated with a multicast session, and the RRC Reconfiguration message includes:

a hyper frame number (HFN) associated with the MRB;

an MRB identifier associated with the HFN; and a temporary mobile group identity (TMGI) associated with the HFN, a controller circuitry configured to determine a packet data convergence protocol (PDCP) state variable managed for the MRB, based on the HFN included in the RRC Reconfiguration message, and determine, based on the HEN included in the RRC Reconfiguration message, an initial value of RX_DELIV indicating an oldest PDCP service data unit (SDU) among PDCP SDUs that are to be received and have not yet been provided to a higher layer.

6. A non-transitory computer readable medium that stores computer program comprising instructions that, when the computer program is executed by a user equipment, cause the user equipment to carry out the communication method according to claim 1.

* * * * *